United States Patent
Jablokov et al.

(10) Patent No.: US 9,973,450 B2
(45) Date of Patent: May 15, 2018

(54) METHODS AND SYSTEMS FOR DYNAMICALLY UPDATING WEB SERVICE PROFILE INFORMATION BY PARSING TRANSCRIBED MESSAGE STRINGS

(75) Inventors: Victor Roman Jablokov, Charlotte, NC (US); Igor Roditis Jablokov, Charolotte, NC (US)

(73) Assignee: Amazon Technologies, Inc., Seattle, WA (US)

( * ) Notice: Subject to any disclaimer, the term of this patent is extended or adjusted under 35 U.S.C. 154(b) by 1593 days.

(21) Appl. No.: 12/212,644

(22) Filed: Sep. 17, 2008

(65) Prior Publication Data

US 2009/0083032 A1    Mar. 26, 2009

Related U.S. Application Data

(60) Provisional application No. 60/972,851, filed on Sep. 17, 2007, provisional application No. 60/972,853, (Continued)

(51) Int. Cl.
*H04L 12/58* (2006.01)
*H04M 1/725* (2006.01)
(Continued)

(52) U.S. Cl.
CPC ............ *H04L 51/04* (2013.01); *G10L 15/26* (2013.01); *H04M 1/72552* (2013.01);
(Continued)

(58) Field of Classification Search
CPC ....... G10L 15/26; H04L 51/04; H04L 51/066; H04L 12/581; H04L 12/5835;
(Continued)

(56) References Cited

U.S. PATENT DOCUMENTS 5,036,538 A    7/1991    Oken
5,623,609 A    4/1997    Kaye et al.
(Continued)

FOREIGN PATENT DOCUMENTS

EP          1274222        1/2003
WO       2006101528       9/2006

OTHER PUBLICATIONS

Allauzen, C., et al., A Generalized Composition Algorithm for Weighted Finite-State Transducers, Interspeech, Brighton, U.K., Sep. 2009, pp. 1203-1206.

(Continued)

*Primary Examiner* — Angela A Armstrong
(74) *Attorney, Agent, or Firm* — Knobbe, Martens, Olson & Bear, LLP

(57) ABSTRACT

One or more computing devices may receive audio data from a first client device. The one or more computing devices may also receive a designation of a second client device from the first client device. The one or more computing devices may transcribe the audio data to text, and may further identify profile information associated with a user of the first client device in the transcribed text. The profile information may be stored to a profile associated with the user of the first client device. The one or more computing devices may also transmit at least one of the audio data or the transcribed text to the second client device.

32 Claims, 13 Drawing Sheets

Related U.S. Application Data filed on Sep. 17, 2007, provisional application No. 60/972,854, filed on Sep. 17, 2007, provisional application No. 60/972,936, filed on Sep. 17, 2007, provisional application No. 60/972,943, filed on Sep. 17, 2007, provisional application No. 60/972,944, filed on Sep. 17, 2007.

(51) Int. Cl.
  *H04W 8/20* (2009.01)
  *G10L 15/26* (2006.01)

(52) U.S. Cl.
  CPC ......... *H04M 1/72561* (2013.01); *H04W 8/20* (2013.01); *H04L 51/066* (2013.01)

(58) Field of Classification Search
  CPC ....... H04L 51/32; H04L 51/14; H04L 51/043; H04L 12/18; H04L 67/104; H04L 67/306; H04M 1/72552; H04M 1/72561; H04M 3/53341; H04M 3/5335; H04W 8/20; H04W 4/12; G06Q 50/01
  See application file for complete search history.

(56) References Cited

U.S. PATENT DOCUMENTS

| | | |
|---|---|---|
| 5,675,507 A | 10/1997 | Bobo |
| 5,822,730 A | 10/1998 | Roth et al. |
| 5,852,801 A | 12/1998 | Hon |
| 5,864,603 A | 1/1999 | Haavisto et al. |
| 5,948,061 A | 9/1999 | Merriman et al. |
| 5,974,413 A | 10/1999 | Beauregard et al. |
| 5,995,928 A | 11/1999 | Nguyen |
| 6,026,368 A | 2/2000 | Brown et al. |
| 6,100,882 A | 8/2000 | Sharman et al. |
| 6,173,259 B1 | 1/2001 | Bilj et al. |
| 6,219,638 B1 | 1/2001 | Padmanabhan et al. |
| 6,212,498 B1 | 4/2001 | Sherwood et al. |
| 6,219,407 B1 | 4/2001 | Kanevsky et al. |
| 6,253,177 B1 | 6/2001 | Lewis et al. |
| 6,298,326 B1 | 10/2001 | Feller |
| 6,366,886 B1 | 4/2002 | Dragosh et al. |
| 6,401,075 B1 | 6/2002 | Mason et al. |
| 6,453,290 B1 | 9/2002 | Jochumson |
| 6,490,561 B1 | 12/2002 | Wilson et al. |
| 6,519,562 B1 | 2/2003 | Phillips et al. |
| 6,532,446 B1 | 3/2003 | King |
| 6,571,210 B2 | 5/2003 | Hon et al. |
| 6,604,077 B2 | 8/2003 | Dragosh et al. |
| 6,654,448 B1 | 11/2003 | Agraharam et al. |
| 6,687,339 B2 | 2/2004 | Martin |
| 6,687,689 B1 | 2/2004 | Fung et al. |
| 6,704,034 B1 | 3/2004 | Rodriguez et al. |
| 6,760,700 B2 | 7/2004 | Lewis et al. |
| 6,775,360 B2 | 8/2004 | Davidson et al. |
| 6,816,468 B1 | 11/2004 | Cruickshank |
| 6,816,578 B1 | 11/2004 | Kredo et al. |
| 6,820,055 B2 | 11/2004 | Saindon et al. |
| 6,850,609 B1 | 2/2005 | Schrage |
| 6,856,960 B1 | 2/2005 | Dragosh et al. |
| 6,859,996 B1 | 3/2005 | Slife et al. |
| 6,865,258 B1 | 3/2005 | Polcyn |
| 6,895,084 B1 | 5/2005 | Saylor et al. |
| 6,961,700 B2 | 11/2005 | Mitchell et al. |
| 6,980,954 B1 | 12/2005 | Zhao et al. |
| 7,007,074 B2 | 2/2006 | Radwin |
| 7,013,275 B2 | 3/2006 | Arnold et al. |
| 7,035,804 B2 | 4/2006 | Saindon et al. |
| 7,035,901 B1 | 4/2006 | Kumagai et al. |
| 7,039,599 B2 | 5/2006 | Merriman et al. |
| 7,047,200 B2 | 5/2006 | Schmid et al. |
| 7,062,435 B2 | 6/2006 | Tzirkel-Hancock et al. |
| 7,089,184 B2 | 8/2006 | Rorex |
| 7,089,194 B1 | 8/2006 | Berstis et al. |
| 7,133,513 B1 | 11/2006 | Zhang |
| 7,136,875 B2 | 11/2006 | Anderson et al. |
| 7,146,320 B2 | 12/2006 | Ju et al. |
| 7,146,615 B1 | 12/2006 | Hervet et al. |
| 7,181,387 B2 | 2/2007 | Ju et al. |
| 7,181,398 B2 | 2/2007 | Thong et al. |
| 7,200,555 B1 | 4/2007 | Ballard et al. |
| 7,206,932 B1 | 4/2007 | Kirchhoff |
| 7,225,125 B2 | 5/2007 | Bennett et al. |
| 7,225,224 B2 | 5/2007 | Nakamura |
| 7,233,655 B2 | 6/2007 | Gailey et al. |
| 7,236,580 B1 | 6/2007 | Sarkar et al. |
| 7,254,384 B2 | 8/2007 | Gailey et al. |
| 7,260,534 B2 | 8/2007 | Gandhi et al. |
| 7,280,966 B2 | 10/2007 | Ju et al. |
| 7,302,280 B2 | 11/2007 | Hinckley et al. |
| 7,310,601 B2 | 12/2007 | Nishizaki et al. |
| 7,313,526 B2 | 12/2007 | Roth et al. |
| 7,319,957 B2 | 1/2008 | Robinson et al. |
| 7,324,942 B1 | 1/2008 | Mahowald et al. |
| 7,328,155 B2 | 2/2008 | Endo et al. |
| 7,330,815 B1 | 2/2008 | Jochumson |
| 7,363,229 B2 | 4/2008 | Falcon et al. |
| 7,376,556 B2 | 5/2008 | Bennett |
| 7,379,870 B1 | 5/2008 | Belvin et al. |
| 7,392,185 B2 | 6/2008 | Bennett |
| 7,401,122 B2 | 7/2008 | Chen |
| 7,418,387 B2 | 8/2008 | Mowatt et al. |
| 7,475,404 B2 | 1/2009 | Hamel |
| 7,496,625 B1 | 2/2009 | Belcher et al. |
| 7,539,086 B2 | 5/2009 | Jaroker |
| 7,555,431 B2 | 6/2009 | Bennett |
| 7,571,100 B2 | 8/2009 | Lenir et al. |
| 7,577,569 B2 | 8/2009 | Roth et al. |
| 7,590,534 B2 | 9/2009 | Vatland |
| 7,634,403 B2 | 12/2009 | Roth et al. |
| 7,640,158 B2 | 12/2009 | Detlef et al. |
| 7,640,160 B2 | 12/2009 | Di Cristo et al. |
| 7,650,284 B2 | 1/2010 | Cross et al. |
| 7,657,424 B2 | 2/2010 | Bennett |
| 7,668,718 B2 | 2/2010 | Kahn et al. |
| 7,672,841 B2 | 3/2010 | Bennett |
| 7,680,661 B2 | 3/2010 | Co et al. |
| 7,685,509 B1 | 3/2010 | Clark et al. |
| 7,689,415 B1 | 3/2010 | Jochumson |
| 7,702,508 B2 | 4/2010 | Bennett |
| 7,707,163 B2 | 4/2010 | Anzalone et al. |
| 7,716,058 B2 | 5/2010 | Roth et al. |
| 7,725,307 B2 | 5/2010 | Bennett |
| 7,725,321 B2 | 5/2010 | Bennett |
| 7,729,904 B2 | 6/2010 | Bennett |
| 7,729,912 B1 | 6/2010 | Bacchiani et al. |
| 7,747,437 B2 | 6/2010 | Verhasselt et al. |
| 7,757,162 B2 | 7/2010 | Barrus et al. |
| 7,769,764 B2 | 8/2010 | Ramer et al. |
| 7,796,980 B1 | 9/2010 | McKinney et al. |
| 7,809,574 B2 | 10/2010 | Roth et al. |
| 7,822,610 B2 | 10/2010 | Burns et al. |
| 7,852,993 B2 | 12/2010 | Ju et al. |
| 7,890,329 B2 | 2/2011 | Wu et al. |
| 7,890,586 B1 | 2/2011 | McNamara et al. |
| 7,899,670 B1 | 3/2011 | Young et al. |
| 7,899,671 B2 | 3/2011 | Cooper et al. |
| 7,904,301 B2 | 3/2011 | Densham et al. |
| 7,907,705 B1 | 3/2011 | Huff et al. |
| 7,908,141 B2 | 3/2011 | Belknap |
| 7,908,273 B2 | 3/2011 | DiMaria et al. |
| 7,925,716 B2 | 4/2011 | Zhang et al. |
| 7,949,529 B2 | 5/2011 | Weider et al. |
| 7,957,975 B2 | 6/2011 | Burns et al. |
| 7,970,610 B2 | 6/2011 | Downey |
| 8,010,358 B2 | 8/2011 | Chen |
| 8,027,836 B2 | 9/2011 | Baker et al. |
| 8,032,372 B1 | 10/2011 | Zimmerman et al. |
| 8,050,918 B2 | 11/2011 | Ghasemi et al. |
| 8,069,047 B2 | 11/2011 | Cross et al. |
| 8,073,700 B2 | 12/2011 | Jamarillo et al. |
| 8,106,285 B2 | 1/2012 | Gerl et al. |
| 8,117,268 B2 | 2/2012 | Jablokov et al. |

(56) References Cited

U.S. PATENT DOCUMENTS

| | | |
|---|---|---|
| 8,121,838 B2 | 2/2012 | Kobal et al. |
| 8,126,120 B2 | 2/2012 | Stifelman et al. |
| 8,135,578 B2 | 3/2012 | Hébert |
| 8,140,632 B1 | 3/2012 | Jablokov et al. |
| 8,145,485 B2 | 3/2012 | Brown |
| 8,145,493 B2 | 3/2012 | Cross, Jr. et al. |
| 8,209,184 B1 | 6/2012 | Dragosh et al. |
| 8,229,743 B2 | 7/2012 | Carter |
| 8,296,139 B2 | 10/2012 | Da Palma et al. |
| 8,296,377 B1 | 10/2012 | Jablokov et al. |
| 8,301,454 B2 | 10/2012 | Paden |
| 8,311,825 B2 | 11/2012 | Chen |
| 8,326,636 B2 | 12/2012 | White |
| 8,335,829 B1 | 12/2012 | Jablokov et al. |
| 8,335,830 B2 | 12/2012 | Jablokov et al. |
| 8,352,261 B2 | 1/2013 | Terrell, II et al. |
| 8,352,264 B2 | 1/2013 | White |
| 8,355,920 B2 | 1/2013 | Gopinath et al. |
| 8,380,511 B2 | 2/2013 | Cave et al. |
| 8,401,850 B1 | 3/2013 | Jochumson |
| 8,433,574 B2 | 3/2013 | Jablokov et al. |
| 8,417,530 B1 | 4/2013 | Hayes |
| 8,498,872 B2 | 7/2013 | White et al. |
| 8,510,094 B2 | 8/2013 | Chin et al. |
| 8,510,109 B2 | 8/2013 | Terrell, II et al. |
| 8,543,396 B2 | 9/2013 | Terrell, II et al. |
| 8,589,164 B1 | 11/2013 | Mengibar et al. |
| 8,611,871 B2 | 12/2013 | Terrell, II |
| 8,670,977 B2 | 3/2014 | Saraclar et al. |
| 8,793,122 B2 | 7/2014 | White et al. |
| 8,898,065 B2 | 11/2014 | Newman et al. |
| 9,009,055 B1 | 4/2015 | Jablokov et al. |
| 9,053,489 B2 | 6/2015 | Jablokov et al. |
| 9,093,061 B1 | 7/2015 | Secker-Walker et al. |
| 9,099,087 B2 | 8/2015 | Adams et al. |
| 9,330,401 B2 | 5/2016 | Terrell, II |
| 9,369,581 B2 | 6/2016 | Hirschberg et al. |
| 9,384,735 B2 | 7/2016 | White et al. |
| 9,436,951 B1 | 9/2016 | Jablokov et al. |
| 9,542,944 B2 | 1/2017 | Jablokov et al. |
| 9,583,107 B2 | 2/2017 | Terrell, II et al. |
| 2001/0047294 A1 | 11/2001 | Rothschild |
| 2001/0056350 A1 | 12/2001 | Calderone |
| 2001/0056369 A1 | 12/2001 | Takayama et al. |
| 2002/0016712 A1 | 2/2002 | Geurts et al. |
| 2002/0029101 A1 | 3/2002 | Larson et al. |
| 2002/0035474 A1 | 3/2002 | Alpdemir |
| 2002/0052781 A1 | 5/2002 | Aufricht et al. |
| 2002/0087330 A1 | 7/2002 | Lee et al. |
| 2002/0091570 A1 | 7/2002 | Sakagawa |
| 2002/0161579 A1 | 10/2002 | Saindon et al. |
| 2002/0165719 A1 | 11/2002 | Wang et al. |
| 2002/0165773 A1 | 11/2002 | Natsuno et al. |
| 2003/0008661 A1 | 1/2003 | Joyce et al. |
| 2003/0050778 A1 | 1/2003 | Nguyen et al. |
| 2003/0028601 A1 | 2/2003 | Rowe |
| 2003/0093315 A1 | 5/2003 | Sato |
| 2003/0101054 A1 | 5/2003 | Davis et al. |
| 2003/0105630 A1 | 6/2003 | MacGinitie et al. |
| 2003/0115060 A1 | 6/2003 | Junqua et al. |
| 2003/0125955 A1 | 7/2003 | Arnold et al. |
| 2003/0126216 A1 | 7/2003 | Avila et al. |
| 2003/0139922 A1 | 7/2003 | Hoffmann et al. |
| 2003/0144906 A1 | 7/2003 | Fujimoto et al. |
| 2003/0149566 A1 | 8/2003 | Levin et al. |
| 2003/0182113 A1 | 9/2003 | Huang |
| 2003/0187643 A1 | 10/2003 | Van Thong et al. |
| 2003/0191639 A1 | 10/2003 | Mazza |
| 2003/0200086 A1 | 10/2003 | Kawazoe et al. |
| 2003/0200093 A1 | 10/2003 | Lewis et al. |
| 2003/0212554 A1 | 11/2003 | Vatland |
| 2003/0220792 A1 | 11/2003 | Kobayashi et al. |
| 2003/0220798 A1 | 11/2003 | Schmid et al. |
| 2003/0223556 A1 | 12/2003 | Ju et al. |
| 2004/0005877 A1 | 1/2004 | Vaananen |
| 2004/0015547 A1 | 1/2004 | Griffin et al. |
| 2004/0019488 A1 | 1/2004 | Portillo |
| 2004/0059632 A1 | 3/2004 | Kang et al. |
| 2004/0059708 A1 | 3/2004 | Dean et al. |
| 2004/0059712 A1 | 3/2004 | Dean et al. |
| 2004/0107107 A1 | 6/2004 | Lenir et al. |
| 2004/0133655 A1 | 7/2004 | Yen et al. |
| 2004/0151358 A1 | 8/2004 | Yanagita et al. |
| 2004/0176906 A1 | 9/2004 | Matsubara et al. |
| 2004/0193420 A1* | 9/2004 | Kennewick et al. ......... 704/257 |
| 2004/0199595 A1 | 10/2004 | Banister et al. |
| 2005/0004799 A1 | 1/2005 | Lyudovyk |
| 2005/0010641 A1* | 1/2005 | Staack ..................... 709/206 |
| 2005/0021344 A1 | 1/2005 | Davis et al. |
| 2005/0027538 A1 | 2/2005 | Halonen et al. |
| 2005/0080786 A1 | 4/2005 | Fish et al. |
| 2005/0101355 A1 | 5/2005 | Hon et al. |
| 2005/0102142 A1 | 5/2005 | Soufflet et al. |
| 2005/0149326 A1 | 7/2005 | Hogengout et al. |
| 2005/0154587 A1 | 7/2005 | Funari et al. |
| 2005/0165609 A1 | 7/2005 | Zuberec et al. |
| 2005/0177376 A1 | 8/2005 | Cooper et al. |
| 2005/0182628 A1 | 8/2005 | Choi |
| 2005/0187768 A1 | 8/2005 | Godden |
| 2005/0188029 A1 | 8/2005 | Asikainen et al. |
| 2005/0197145 A1 | 9/2005 | Chae et al. |
| 2005/0197840 A1 | 9/2005 | Wang et al. |
| 2005/0203751 A1 | 9/2005 | Stevens et al. |
| 2005/0209868 A1 | 9/2005 | Wan et al. |
| 2005/0239495 A1 | 10/2005 | Bayne |
| 2005/0240406 A1 | 10/2005 | Carroll |
| 2005/0261907 A1 | 11/2005 | Smolenski et al. |
| 2005/0266884 A1 | 12/2005 | Marriott et al. |
| 2005/0288926 A1 | 12/2005 | Benco et al. |
| 2006/0004570 A1 | 1/2006 | Ju et al. |
| 2006/0009974 A1 | 1/2006 | Junqua et al. |
| 2006/0143007 A1 | 1/2006 | Koh et al. |
| 2006/0052127 A1 | 3/2006 | Wolter |
| 2006/0053016 A1 | 3/2006 | Falcon et al. |
| 2006/0074895 A1 | 4/2006 | Belknap |
| 2006/0075055 A1 | 4/2006 | Littlefield |
| 2006/0111907 A1 | 5/2006 | Mowatt et al. |
| 2006/0122834 A1 | 6/2006 | Bennett |
| 2006/0129455 A1 | 6/2006 | Shah |
| 2006/0149558 A1 | 7/2006 | Kahn et al. |
| 2006/0149630 A1 | 7/2006 | Elliott et al. |
| 2006/0159507 A1 | 7/2006 | Jaweth et al. |
| 2006/0161429 A1 | 7/2006 | Falcon et al. |
| 2006/0195318 A1 | 8/2006 | Stanglmayr |
| 2006/0195541 A1 | 8/2006 | Ju et al. |
| 2006/0217159 A1 | 9/2006 | Watson |
| 2006/0235684 A1 | 10/2006 | Chang |
| 2006/0235695 A1 | 10/2006 | Thrift et al. |
| 2007/0005368 A1 | 1/2007 | Chutorash et al. |
| 2007/0005795 A1 | 1/2007 | Gonzalez |
| 2007/0033005 A1* | 2/2007 | Cristo et al. ..................... 704/9 |
| 2007/0038451 A1 | 2/2007 | Cogne et al. |
| 2007/0038740 A1 | 2/2007 | Steeves |
| 2007/0038923 A1 | 2/2007 | Patel |
| 2007/0043569 A1 | 2/2007 | Potter et al. |
| 2007/0061146 A1 | 3/2007 | Jaramillo et al. |
| 2007/0061148 A1 | 3/2007 | Cross et al. |
| 2007/0061300 A1 | 3/2007 | Ramer et al. |
| 2007/0079383 A1 | 4/2007 | Gopalakrishnan |
| 2007/0086773 A1 | 4/2007 | Ramsten et al. |
| 2007/0106506 A1 | 5/2007 | Ma et al. |
| 2007/0106507 A1 | 5/2007 | Charoenruengkit et al. |
| 2007/0115845 A1 | 5/2007 | Hochwarth et al. |
| 2007/0118374 A1 | 5/2007 | Wise et al. |
| 2007/0118426 A1 | 5/2007 | Barnes, Jr. |
| 2007/0118592 A1 | 5/2007 | Bachenberg |
| 2007/0123222 A1 | 5/2007 | Cox et al. |
| 2007/0133769 A1 | 6/2007 | Da Palma et al. |
| 2007/0133771 A1 | 6/2007 | Stifelman et al. |
| 2007/0150275 A1 | 6/2007 | Garner et al. |
| 2007/0156400 A1 | 7/2007 | Wheeler |
| 2007/0180718 A1 | 8/2007 | Fourquin et al. |
| 2007/0233487 A1 | 10/2007 | Cohen et al. |
| 2007/0233488 A1 | 10/2007 | Carus et al. |

(56) References Cited

U.S. PATENT DOCUMENTS

| | | |
|---|---|---|
| 2007/0239837 A1 | 10/2007 | Jablokov et al. |
| 2007/0255794 A1 | 11/2007 | Coutts |
| 2008/0016142 A1 | 1/2008 | Schneider |
| 2008/0037720 A1 | 2/2008 | Thomson et al. |
| 2008/0040683 A1 | 2/2008 | Walsh |
| 2008/0052073 A1 | 2/2008 | Goto et al. |
| 2008/0052075 A1 | 2/2008 | He et al. |
| 2008/0063154 A1* | 3/2008 | Tamari ............... H04M 11/04 379/88.13 |
| 2008/0063155 A1 | 3/2008 | Doulton |
| 2008/0065481 A1 | 3/2008 | Immorlica et al. |
| 2008/0065737 A1 | 3/2008 | Burke et al. |
| 2008/0077406 A1 | 3/2008 | Ganong, III |
| 2008/0091426 A1 | 4/2008 | Rempel et al. |
| 2008/0092168 A1* | 4/2008 | Logan ............... G06F 17/30265 725/44 |
| 2008/0120375 A1* | 5/2008 | Levy ............... G06Q 10/10 709/204 |
| 2008/0133232 A1 | 6/2008 | Doulton |
| 2008/0147404 A1 | 6/2008 | Liu et al. |
| 2008/0154600 A1 | 6/2008 | Tian et al. |
| 2008/0154870 A1 | 6/2008 | Evermann et al. |
| 2008/0155060 A1 | 6/2008 | Weber et al. |
| 2008/0172781 A1 | 7/2008 | Popowich et al. |
| 2008/0177551 A1 | 7/2008 | Schalk |
| 2008/0195588 A1 | 8/2008 | Kim et al. |
| 2008/0198898 A1 | 8/2008 | Skakkebaek et al. |
| 2008/0198980 A1 | 8/2008 | Skakkebaek et al. |
| 2008/0198981 A1 | 8/2008 | Skakkebaek et al. |
| 2008/0200153 A1 | 8/2008 | Fitzpatrick et al. |
| 2008/0201139 A1 | 8/2008 | Yu et al. |
| 2008/0208582 A1 | 8/2008 | Gallino |
| 2008/0208590 A1 | 8/2008 | Cross, Jr. et al. |
| 2008/0221897 A1 | 9/2008 | Cerra et al. |
| 2008/0243500 A1 | 10/2008 | Bisani et al. |
| 2008/0243504 A1 | 10/2008 | Poi |
| 2008/0261564 A1 | 10/2008 | Logan |
| 2008/0275864 A1 | 11/2008 | Kim et al. |
| 2008/0275873 A1* | 11/2008 | Bosarge et al. ............... 707/5 |
| 2008/0301250 A1 | 12/2008 | Hardy |
| 2008/0313039 A1 | 12/2008 | Altberg et al. |
| 2008/0317219 A1 | 12/2008 | Manzardo |
| 2009/0006194 A1 | 1/2009 | Sridharan et al. |
| 2009/0012793 A1 | 1/2009 | Dao et al. |
| 2009/0037255 A1 | 2/2009 | Chiu et al. |
| 2009/0043855 A1 | 2/2009 | Bookstaff et al. |
| 2009/0055175 A1 | 2/2009 | Terrell, II et al. |
| 2009/0055179 A1 | 2/2009 | Cho et al. |
| 2009/0055538 A1* | 2/2009 | Conradt ............... H04N 7/173 709/227 |
| 2009/0063151 A1 | 3/2009 | Arrowood et al. |
| 2009/0063268 A1 | 3/2009 | Burgess et al. |
| 2009/0076821 A1 | 3/2009 | Brenner et al. |
| 2009/0076917 A1 | 3/2009 | Jablokov et al. |
| 2009/0077493 A1 | 3/2009 | Hempel et al. |
| 2009/0086958 A1 | 4/2009 | Altberg et al. |
| 2009/0100050 A1 | 4/2009 | Erol et al. |
| 2009/0117922 A1 | 5/2009 | Bell |
| 2009/0124272 A1 | 5/2009 | White et al. |
| 2009/0125299 A1 | 5/2009 | Wang |
| 2009/0141875 A1 | 6/2009 | Demmitt et al. |
| 2009/0150156 A1 | 6/2009 | Kennewick et al. |
| 2009/0150405 A1 | 6/2009 | Grouf et al. |
| 2009/0157401 A1 | 6/2009 | Bennett |
| 2009/0163187 A1 | 6/2009 | Terrell, II |
| 2009/0170478 A1 | 7/2009 | Doulton |
| 2009/0182559 A1 | 7/2009 | Gerl et al. |
| 2009/0182560 A1 | 7/2009 | White |
| 2009/0199101 A1 | 8/2009 | Cross et al. |
| 2009/0204410 A1 | 8/2009 | Mozer et al. |
| 2009/0210214 A1 | 8/2009 | Qian et al. |
| 2009/0228274 A1 | 9/2009 | Terrell, II et al. |
| 2009/0240488 A1 | 9/2009 | White et al. |
| 2009/0248415 A1 | 10/2009 | Jablokov et al. |
| 2009/0271194 A1 | 10/2009 | Davis et al. |
| 2009/0276215 A1 | 11/2009 | Hager |
| 2009/0282363 A1 | 11/2009 | Jhaveri et al. |
| 2009/0307090 A1 | 12/2009 | Gupta et al. |
| 2009/0312040 A1 | 12/2009 | Gupta et al. |
| 2009/0319187 A1 | 12/2009 | Deeming et al. |
| 2010/0017294 A1 | 1/2010 | Mancarella et al. |
| 2010/0049525 A1 | 2/2010 | Paden |
| 2010/0058200 A1 | 3/2010 | Jablokov et al. |
| 2010/0121629 A1 | 5/2010 | Cohen |
| 2010/0145700 A1 | 6/2010 | Kennewick et al. |
| 2010/0146077 A1 | 6/2010 | Davies et al. |
| 2010/0180202 A1 | 7/2010 | Del Valle Lopez |
| 2010/0182325 A1 | 7/2010 | Cederwall et al. |
| 2010/0191619 A1 | 7/2010 | Dicker et al. |
| 2010/0223056 A1 | 9/2010 | Kadirkamanathan |
| 2010/0268726 A1 | 10/2010 | Gorodyansky et al. |
| 2010/0278453 A1 | 11/2010 | King |
| 2010/0279667 A1 | 11/2010 | Wehrs et al. |
| 2010/0286901 A1 | 11/2010 | Geelen et al. |
| 2010/0293242 A1 | 11/2010 | Buchheit et al. |
| 2010/0312619 A1 | 12/2010 | Ala-Pietila et al. |
| 2010/0312640 A1 | 12/2010 | Haldeman et al. |
| 2011/0029876 A1 | 2/2011 | Slotznick et al. |
| 2011/0040629 A1 | 2/2011 | Chiu et al. |
| 2011/0054900 A1 | 3/2011 | Phillips et al. |
| 2011/0064207 A1 | 3/2011 | Chiu et al. |
| 2011/0144973 A1 | 6/2011 | Bocchieri et al. |
| 2011/0161072 A1 | 6/2011 | Terao et al. |
| 2011/0161276 A1 | 6/2011 | Krumm et al. |
| 2011/0047452 A1 | 12/2011 | Ativanichayaphong et al. |
| 2011/0296374 A1 | 12/2011 | Wu et al. |
| 2011/0313764 A1 | 12/2011 | Bacchiani et al. |
| 2012/0022875 A1 | 1/2012 | Cross et al. |
| 2012/0046950 A1 | 2/2012 | Jaramillo et al. |
| 2012/0059653 A1 | 3/2012 | Adams et al. |
| 2012/0095831 A1 | 4/2012 | Aaltonen et al. |
| 2012/0166202 A1* | 6/2012 | Carriere et al. ............ 704/270.1 |
| 2012/0259729 A1 | 10/2012 | Linden et al. |
| 2012/0324391 A1 | 12/2012 | Tocci |
| 2013/0041667 A1 | 2/2013 | Longe et al. |
| 2013/0158994 A1 | 6/2013 | Jaramillo et al. |
| 2013/0211815 A1 | 8/2013 | Seligman et al. |
| 2013/0226894 A1 | 8/2013 | Venkataraman et al. |
| 2013/0281007 A1 | 10/2013 | Edge et al. |
| 2014/0136199 A1 | 5/2014 | Hager |
| 2015/0255067 A1 | 9/2015 | White et al. |
| 2017/0004831 A1 | 1/2017 | White et al. |

OTHER PUBLICATIONS

Bisani, M., et al., Automatic Editing in a Back-End Speech-to-Text System, 2008, 7 pages.

Board of Patent Appeals and Interferences Answer in U.S. Appl. No. 12/352,442 dated May 15, 2012.

Brown, E., et al., Capitalization Recovery for Text, Springer-Verlag Berlin Heidelberg, 2002, 12 pages.

Desilets, A., et al., Extracting Keyphrases From Spoken Audio Documents, Springer-Verlag Berlin Heidelberg, 2002, 15 pages.

Glaser, M., et al., Web-Based Telephony Bridges for the Deaf, proceedings of the South African Telecommunications Networks & Applications Conference (2001), Wild Coast Sun, South Africa, 5 pages.

Gotoh, Y., et al., Sentence Boundary Detection in Broadcase Speech Transcripts, Proceedings of the ISCA Workshop, 2000, 8 pages.

Hori, T., et al., Efficient WFST-Based One-Pass Decoding With On-The-Fly Hypothesis Rescoring in Extremely Large Vocabulary Continuous Speech Recognition, IEEE Transactions on Audio, Speech, and Language Processing, vol. 15, No. 4, May 2007, pp. 1352-1365.

Huang, J., et al., Extracting Caller Information from Voicemail, IBM T.J. Watson Research Center, 2002, pp. 67-77.

Huang, J., et al., Maximum Entropy Model for Punctuation Annotation From Speech, in ICSLP 2002, pp. 917-920.

Information Disclosure Statement (IDS) Letter Regarding Common Patent Application(s) dated Jun. 4, 2010.

(56) References Cited

OTHER PUBLICATIONS

Information Disclosure Statement (IDS) Letter Regarding Common Patent Application(s), dated Dec. 6, 2010.
Information Disclosure Statement (IDS) Letter Regarding Common Patent Application(s), dated Feb. 14, 2012.
Information Disclosure Statement (IDS) Letter Regarding Common Patent Application(s), dated Mar. 17, 2011.
Information Disclosure Statement (IDS) Letter Regarding Common Patent Application(s), dated Nov. 24, 2009.
International Search Report and Written Opinion International Patent Application No. PCT/US2007/008621, dated Nov. 13, 2007.
J2EE Application Overview, publicly available on http://www.orionserever.com/docs/j2eeoverview.html, Mar. 1, 2001.
Justo, R., et al., Phrase Classes in Two-Level Language Models for ASR, Springer-Verlag London Limited, 2008, 11 pages.
Kimura, K., et al., 1992, Association-based natural language processing with neural networks, in proceedings of the 7th annual meeting of the Association of Computational Linguistics, pp. 223-231.
Lewis, J., et al., SoftBridge: An Architecture for Building IP-Based Bridges Over the Digital Divide, Proceedings of the South African Telecommunications Networks & Applications Conference (SATNAC 2002), Drakensberg, South Africa, 5 pages.
Li, X., et al., Time based language models, CIKM '03 Proceedings of the twelfth international conference on Information and knowledge management, pp. 469-475, 2003.
Office Action in Canadian Application No. 2648617 dated Feb. 27, 2014.
Ries, K., Segmenting conversations by topic, initiative, and style, Springer-Verlag Berlin Heidelberg, 2002, 16 pages.
Schalkwyk, J., et al., Speech Recognition with Dynamic Grammars Using Finite-State Transducers, Eurospeech 2003-Geneva, pp. 1969-1972.
Shriberg, E., et al., Prosody-based automatic segmentation of speech into sentences and topics, 2000, 31 pages.
Soltau, H., and G. Saon, Dynamic Network Decoding Revisited, Automatic Speech Recognition and Understanding, 2009, IEEE Workshop, pp. 276-281.
Stent, A., et al., Geo-Centric Language Models for Local Business Voice Search, Human Language Technologies: The 2009 Annual Conference of the North American Chapter of the ACL, pp. 386-396, 2009.
Thomae, M., et al., Hierarchical Language Models for One-Stage Speech Interpretation, in Interspeech, 2005, pp. 3425-3428.
David H. Kemsley, et al., A Survey of Neural Network Research and Fielded Applications, 1992, in International Journal of Neural Networks: Research and Applications, vol. 2, No. 2/3/4, pp. 123-133. Accessed on Oct. 25, 2007 at http://citeseer.ist.psu.edu/cache/papers/cs/25638/ftp:zSzzSzaxon.cs.byu.eduzSzpubzSzpaperszSzkemsley_92.pdf/kemsley92survey.pdf.
Transl8it! translation engine, publicly available on http://www.transl8it.com since May 30, 2002. Retrieved on Oct. 26, 2007.
vBulletin Community Forum, thread posted on Mar. 5, 2004. Page retrieved on Oct. 26, 2007 from http://www.vbulletin.com/forum/showthread.php?t=96976.
J2EE Application Overview, publicly available on http://www/orionserver.com/docs/j2eeoverview.html since Mar. 1, 2001. Retrieved on Oct. 26, 2007.
Web-based Telephony Bridges for the Deaf, Glaser et al.
SoftBridge: An Architecture for Building IP-based Bridges over the Digital Divide, Lewis et al.
"International Search Report" and "Written Opinion of the International Search Authority" (Korean Intellectual Property Office) in Yap, Inc. International Patent Application Serial No. PCT/US2007/008621 corresponding to current U.S. patent application, Dated Nov. 13, 2007, 8 pages.
Fielding, et al., Hypertext Transfer Protocol—HTTP/1.1, RFC 2616, Network Working Group, sections 7, 9.5, 14.30, 12 pages total.
Marshall, James, HTTP Made Really Easy, Aug. 15, 1997, retrieved from http://www.jmarshall.com/easy/http/ on Jul. 25, 2008, 15 pages total.
Knudsen, Jonathan, Session Handling in MIDP, Jan. 2002, retrieved from http://developers.sun.com/mobility/midp/articles/sessions/ on Jul. 25, 2008, 7 pages total.
David H. Kemsley, et al., A Survey of Neural Network Research and Fielded Applications, 1992, in International Journal of Neural Networks: Research and Applications, vol. 2, No. 2/3/4, pp. 123-133. Accessed on Oct. 25, 2007 at http://citeseer.ist.psu.edu/cache/papers/cs/25638/ftp:zSzzSzaxon.cs.byu.eduzSzpubzSzpaperszSzkemsley_92.pdf/kemsley92survey.pdf, 12 pages total.
Transl8it! translation engine, publicly available on http://www.transl8it.com since May 30, 2002. Retrieved on Oct. 26, 2007, 6 pages total.
vBulletin Community Forum, thread posted on Mar. 5, 2004. Page retrieved on Oct. 26, 2007 from http://www.vbulletin.com/forum/showthread.php?t=96976, 1 page total.
J2EE Application Overview, publicly available on http://www/orionserver.com/docs/j2eeoverview.html since Mar. 1, 2001. Retrieved on Oct. 26, 2007, 3 pages total.
"International Search Report"and "Written Opinion of the International Search Authority" (Korean Intellectual Property Office) in Yap, Inc. International Patent Application Serial No. PCT/US2007/008621, dated Nov. 13, 2007, 13 pages total.
Information Disclosure Statement (IDS) Letter Regarding Common Patent Application(s), submitted by Applicant on Jul. 21, 2009.
Information Disclosure Statement (IDS) Letter Regarding Common Patent Application(s), dated Jun. 4, 2010.
Huang, J., Zweig, G. Padmanabhan, M., 2002, Extracting caller information from voicemail, Springer-Verlag Berlin Heidelberg, 11 pages.
Information Disclosure Statement (IDS) Letter Regarding Common Patent Application(s), dated Jul. 21, 2011.

* cited by examiner

```
POST /Yap/Login HTTP/1.1
Host: www.icynine.com:8080
User-Agent: Motorola-V3m Obigo/Q04C1 MMP/2.0 Profile/MIDP-2.0
Accept: application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Yap-Phone-Number: 15615551234
Yap-User-ID: 1143
Yap-Version: 1.0.3
Yap-Audio-Record: amr
Yap-Audio-Play: amr
Connection: close
```

FIG. 8

Login/Login HEADER

| Request Headers | Request Body | Response Body |
|---|---|---|
| User-Agent | NA | YAP URL |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 9*

Yap/Login HEADER

| Request Headers | Request Body | Response Body |
|---|---|---|
| User-Agent | NA | YAP SessionId |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 10*

SUBMIT HEADER

| Request Headers | Request Body | Response Body |
|---|---|---|
| User-Agent | Binary Audio Data | Submit Receipt |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-Filter-Set | | |
| Yap-ASR-Engine (optional) | | |
| Yap-Return-Cells | | |
| Yap-Return-TTS | | |
| Yap-Content-Type | | |
| Yap-Content-Length | | |

Binary Data Field

FIG. 11

RESULTS HEADER

| Request Headers | Request Body | Response Body |
|---|---|---|
| User-Agent | N/A | Results Object |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Password | | |
| Yap-Results-Receipt | | |
| Yap-Results-Timeout | | |

FIG. 12

Returns: an XML Hierarchy containing

- result—the body of result xml
- result-type
- result-code
- result-code-description
- result text
- result-is-silence
- result-details
- result-conf
- lattice

FIG. 13

TTS HEADER

Yap/Login HEADER

| Request Headers | Request Body | Response Body |
|---|---|---|
| User-Agent | NA | TTS Binary Audio Data |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-TTS-String | | |
| Yap-TTS-Voice | | |

*FIG. 14*

CORRECT HEADER

TTS HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Results-Receipt | | |
| Yap-Correction | | |

*FIG. 15*

PING HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |

*FIG. 16*

DEBUG HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Debug-Msg | | |

*FIG. 17*

METHODS AND SYSTEMS FOR DYNAMICALLY UPDATING WEB SERVICE PROFILE INFORMATION BY PARSING TRANSCRIBED MESSAGE STRINGS

I. CROSS-REFERENCE TO RELATED APPLICATIONS

The present application is a nonprovisional patent application of, and claims priority under 35 U.S.C. § 119(e) to, each of the following:
(1) U.S. provisional patent application Ser. No. 60/972,851, filed Sep. 17, 2007 and titled "SYSTEM AND METHOD FOR DELIVERING MOBILE ADVERTISING WITHIN A THREADED SMS OR IM CHAT CONVERSATION ON A MOBILE DEVICE CLIENT";
(2) U.S. provisional patent application Ser. No. 60/972,853, filed Sep. 17, 2007 and titled "METHOD AND SYSTEM FOR DYNAMIC PERSONALIZATION AND QUERYING OF USER PROFILES BASED ON SMS/IM CHAT MESSAGING ON A MOBILE DEVICE";
(3) U.S. provisional patent application Ser. No. 60/972,854, filed Sep. 17, 2007 and titled "LOCATION, TIME & SEASON AWARE MOBILE ADVERTISING DELIVERY";
(4) U.S. provisional patent application Ser. No. 60/972,936, filed Sep. 17, 2007 and titled "DELIVERING TARGETED ADVERTISING TO MOBILE DEVICE FOR PRESENTATION WITHIN SMSes OR IM CONVERSATIONS";
(5) U.S. provisional patent application Ser. No. 60/972,943, filed Sep. 17, 2007 and titled "DYNAMIC PERSONALIZATION AND QUERYING OF USER PROFILES BASED ON SMSes AND IM CONVERSATIONS"; and
(6) U.S. provisional patent application Ser. No. 60/972,944, filed Sep. 17, 2007 and titled "LOCATION, TIME, AND SEASON AWARE ADVERTISING DELIVERY TO AND PRESENTATION ON MOBILE DEVICE WITHIN SMSes OR IM CONVERSATIONS OR USER INTERFACE THEREOF".

Each of the foregoing patent applications from which priority is claimed is hereby incorporated herein by reference in its entirety. Additionally, U.S. Patent Application Publication No. US 2007/0239837 is incorporated herein by reference, and each of the following patent applications, and any corresponding patent application publications thereof, are incorporated herein by reference: U.S. nonprovisional patent application Ser. No. 12/197,213, filed Aug. 22, 2008 and titled "CONTINUOUS SPEECH TRANSCRIPTION PERFORMANCE INDICATION"; U.S. nonprovisional patent application Ser. No. 12/198,112, filed Aug. 25, 2008 and titled "FILTERING TRANSCRIPTIONS OF UTTERANCES;" U.S. nonprovisional patent application Ser. No. 12/198,116, filed Aug. 25, 2008 and titled "FACILITATING PRESENTATION BY MOBILE DEVICE OF ADDITIONAL CONTENT FOR A WORD OR PHRASE UPON UTTERANCE THEREOF"; U.S. nonprovisional patent application Ser. No. 12/197,227, filed Aug. 22, 2008 and titled "TRANSCRIBING AND MATCHING MOBILE DEVICE UTTERANCES TO KEYWORDS TAKEN FROM MOBILE DEVICE MESSAGES AND ASSOCIATED WITH WEB ADDRESSES"; and U.S. nonprovisional patent application Ser. No. 12/212,645, filed Sep. 17, 2008 and titled "FACILITATING PRESENTATION OF ADS RELATING TO WORDS OF A MESSAGE."

Finally, the disclosure of provisional application 60/789,837 is contained in APPENDIX A attached hereto and, likewise, is incorporated herein in its entirety by reference and is intended to provide background and technical information with regard to the systems and environments of the inventions of the current provisional patent application. Similarly, the disclosure of the brochure of APPENDIX B is incorporated herein in its entirety by reference.

II. COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the governmental files or records, but otherwise reserves all copyright rights whatsoever.

III. BACKGROUND OF THE PRESENT INVENTION

Both text messaging and instant messaging are forms of personal communication that have grown in popularity and use over the last decade.

In this respect, "text messaging" refers to the sending and receiving of text messages (sometimes abbreviated as "SMSes") via wireless telecommunication systems using a Short Message Service (sometimes abbreviated as SMS). The sending and receiving of such text messages is well known and commonly performed using mobile client devices, such as smart phones or PDAs. Common applications of SMS include person-to-person messaging. However, SMSes also are now used to interact with automated systems, such as ordering products and services for mobile client devices or participating in contests using mobile client devices such as, for example, voting for contestants in American Idol competitions.

In contrast to text messaging, "instant messaging" (sometimes abbreviated as "IM") is a form of "real-time" communication between two or more people that is based on the transmission of text. The text is conveyed over a network such as the Internet. Instant messaging requires an IM client that connects to an IM service. The IM client commonly is installed on a computer such as a laptop or desktop. However, IM clients are now available for use on mobile client devices. Because IM is considered "real-time," communications back and forth between users of IM clients sometimes is deemed a "conversation," just as if the people were speaking directly to one another. The present invention has applicability both in text messaging as well as in instant messaging and, except where context clearly implies otherwise, aspects and features of the present invention apply in the context of both (a) SMS systems, methods, applications, and implementations as well as (b) IM systems, methods, applications, and implementations.

More recently, Automatic Speech Recognition ("ASR") systems, which convert spoken audio into text, have been applied to text messaging and instant messaging. As used herein, the term "speech recognition" refers to the process of converting a speech (audio) signal to a sequence of words or a representation thereof (message strings), by means of an algorithm implemented as a computer program. Speech recognition applications that have emerged over the last few years include voice dialing (e.g., "Call home"), call routing (e.g., "I would like to make a collect call"), simple data entry (e.g., entering a credit card number), preparation of structured documents (e.g., a radiology report), and content-based spoken audio searching (e.g. finding a podcast where particular words were spoken).

As their accuracy has improved, ASR systems have become commonplace in recent years. For example, ASR systems have found wide application in customer service centers of companies. The customer service centers offer middleware and solutions for contact centers. For example, they answer and route calls to decrease costs for airlines, banks, etc. In order to accomplish this, companies such as IBM and Nuance create assets known as IVR (Interactive Voice Response) that answer the calls, then use ASR (Automatic Speech Recognition) paired with TTS (Text-To-Speech) software to decode what the caller is saying and communicate back to them.

The application of ASR systems to text messaging and instant messaging has been more recent. Text messaging and instant messaging usually involves the input of a textual message by a sender who presses letters and/or numbers associated with the sender's mobile phone or other mobile device. As recognized for example in the aforementioned, commonly-assigned U.S. patent application Ser. No. 11/697, 074, it can be advantageous to make text messaging and instant messaging far easier for an end user by allowing the user to dictate his or her message rather than requiring the user to type it into his or her phones. In certain circumstances, such as when a user is driving a vehicle, typing a text message may not be possible and/or convenient, and may even be unsafe. On the other hand, text messages can be advantageous to a message receiver as compared to voicemail, as the receiver actually sees the message content in a written format rather than having to rely on an auditory signal.

Now or in the future, users can or will be able to use mobile client devices to interface with many web services via an IM client and/or SMSes. It is believed, for example, that users can or will interact with web services using text messages and/or instant messages such as those provided by Amazon, Facebook, and MySpace. This may be accomplished, for example, using either manually-typed text messages and/or instant messages or such messages that are transcribed from speech using an ASR engine.

Many such web services promote the establishment of user profiles in order to achieve "recommendation engines" and/or ad targeting. Currently, such web services require users to manually setup user profiles, which is usually done upon first establishing user accounts. Although convenient when first establishing the accounts, maintenance of the data in the user profiles, such as user preferences, requires that users manually login to the user accounts and modify and save changes to user preferences, as desired. Unfortunately, many users perform such manual action irregularly or not at all, and consequently user preferences and other data stored in user profiles tends to become outdated over time as user tastes and preferences change. As a result, these web services subsequently experience degradation in their ability to deliver relevant ads, recommendations, and suggestions to users over time, which can decrease their potential revenue per user that is generated from direct or indirect promotions.

Aspects and features of the present invention are believed to further enable and facilitate the use and acceptance of text messaging and instant messaging with mobile client devices. In particular, inventive aspects and features of the invention relate to parsing and/or filtering of message strings (text of instant messages or text messages) that are either manually typed, transcribed from speech, or part of a stream web services query, in order to identify keywords, phrases, or fragments based on which user preferences of user profiles are dynamically updated.

One or more steps of inventive aspects and features of methods of the invention may be performed in client and/or server side processing.

IV. SUMMARY OF THE INVENTION

The present invention includes many aspects and features. Moreover, while many aspects and features relate to, and are described in, the context of providing profile information to a web service, the present invention is not limited to use only in such field, as will become apparent from the following summaries and detailed descriptions of aspects, features, and one or more embodiments of the present invention.

Accordingly, one aspect of the present invention relates to a method of providing profile information, derived from an utterance, from a mobile communication device to a web service. An exemplary such method includes the steps of receiving, at the mobile communication device, audio data representing an utterance; transcribing the audio data to text; processing the transcribed text, including parsing the text for profile information appropriate for use at one or more web services; and communicating, to the web service, the profile information parsed from the transcribed text. Furthermore, in this aspect of the invention, the processing step may be performed by a profile filter; the method may further comprise providing an interface to a user for manual user editing of the transcribed text; the transcription step may be performed at the mobile communication device; the transcription step may be performed by a separate automatic speech recognition system; the audio data may be a voicemail; the method may further comprise delivering ad impressions to a user based on the processed text; and the method may further comprise communicating the transcribed text, as a text-based message, from the mobile communication device to a recipient. In variations of this aspect, the recipient may be a cell phone; the recipient may be a smart phone; the recipient may be a PDA; the recipient may be a tablet notebook; the recipient may be a desktop computer; the recipient may be a laptop computer; the recipient may be a web service; the text-based message may be a text message, communicated using Short Message Service; and the text-based message may be an instant message, communicated via an instant message service.

Another aspect of the invention relates to a method of providing profile information, derived from an utterance, from a mobile communication device to a web service. An exemplary such method includes transcribing audio data, received as an utterance at the mobile communication device, to text; providing an interface to a user for manual user editing of the transcribed text; processing the edited text, including parsing the text for profile information appropriate for use at one or more web services; and communicating, to the web service, the profile information parsed from the transcribed text. Furthermore, in this aspect of the invention, the processing step may be performed by a profile filter; the transcription step may be performed at the mobile communication device; the transcription step may be performed by a separate automatic speech recognition system; the audio data may be a voicemail; the method may further comprise delivering ad impressions to a user based on the processed text; and the method may further comprise communicating the transcribed text, as a text-based message, from the mobile communication device to the recipient. In variations of this aspect, the recipient may be a cell phone;

the recipient may be a smart phone; the recipient may be a PDA; the recipient may be a tablet notebook; the recipient may be a desktop computer; the recipient may be a laptop computer; the recipient may be a web service; the text-based message may be a text message, communicated using Short Message Service; and the text-based message may be an instant message, communicated via an instant message service.

Another aspect of the invention relates to a method of providing profile information, derived from an utterance, from a mobile communication device to a web service. An exemplary such method includes receiving, at the mobile communication device, audio data representing an utterance that is to be sent from the mobile communication device to a recipient; transcribing the utterance to text; parsing the transcribed text to identify relevant profile information for input to a web service; and communicating the transcribed text, as a text-based message, from the mobile communication device to the recipient. Furthermore, in this aspect of the invention, the parsing step may be performed by a profile filter; the method may further comprise providing an interface to a user for manual user editing of the transcribed text; the transcription step may be performed at the mobile communication device; the transcription step may be performed by a separate automatic speech recognition system; the audio data may be a voicemail; the method may further comprise delivering ad impressions to a user based on the parsed text; and the method may further comprise communicating, to the web service, the profile information parsed from the transcribed text. In variations of this aspect, the recipient may be a cell phone; the recipient may be a smart phone; the recipient may be a PDA; the recipient may be a tablet notebook; the recipient may be a desktop computer; the recipient may be a laptop computer; the recipient may be a web service; the text-based message may be a text message, communicated using Short Message Service; and the text-based message may be an instant message, communicated via an instant message service.

Another aspect of the invention relates to a method of providing profile information, derived from an utterance, from a mobile communication device to a web service. An exemplary such method includes receiving, at the mobile communication device, audio data representing an utterance that is to be sent from the mobile communication device to a recipient; transcribing the utterance to text; parsing the transcribed text to identify relevant profile information for input to a web service; and storing, in a profile information index, the profile information parsed from the transcribed text. Furthermore, in this aspect of the invention, the parsing step may be performed by a profile filter; the method may further comprise providing an interface to a user for manual user editing of the transcribed text; the transcription step may be performed at the mobile communication device; the transcription step may be performed by a separate automatic speech recognition system; the audio data may be a voicemail; the method may further comprise delivering ad impressions to a user based on the parsed text; the method may further comprise communicating, to the web service, the profile information parsed from the transcribed text; and the method may further comprise communicating the transcribed text, as a text-based message, from the mobile communication device to the recipient. In variations of this aspect, the recipient may be a cell phone; the recipient may be a smart phone; the recipient may be a PDA; the recipient may be a tablet notebook; the recipient may be a desktop computer; the recipient may be a laptop computer; the recipient may be a web service; the text-based message may be a text message, communicated using Short Message Service; and the text-based message may be an instant message, communicated via an instant message service.

Another aspect of the invention relates to a method of providing profile information, derived from a message string, from a mobile communication device to a web service. An exemplary such method includes receiving, at the mobile communication device, input representing a text-based message that is to be sent from the mobile communication device to a recipient; producing a message string from the input; parsing the message string to identify relevant profile information for input to a web service; communicating, to the web service, the profile information parsed from the message string; and communicating the message string, as a text-based message, from the mobile communication device to the recipient. Furthermore, in this aspect of the invention, the input may be audio data representing an utterance and the producing step includes transcribing the utterance to text; the parsing step may be performed by a profile filter; the method may further comprise providing an interface to a user for manual user editing of the transcribed text; the transcription step may be performed at the mobile communication device; the transcription step may be performed by a separate automatic speech recognition system; the audio data may be a voicemail; and the method may further comprise delivering ad impressions to a user based on the parsed text. In variations of this aspect, the recipient may be a cell phone; the recipient may be a smart phone; the recipient may be a PDA; the recipient may be a tablet notebook; the recipient may be a desktop computer; the recipient may be a laptop computer; the recipient may be a web service; the text-based message may be a text message, communicated using Short Message Service; and the text-based message may be an instant message, communicated via an instant message service.

Another aspect of the invention relates to a method of providing profile information, derived from an instant message, from a client device to a web service. An exemplary such method includes receiving, at the client device, input representing an instant message that is to be sent from the client device to a recipient; producing a message string from the input; parsing the message string to identify relevant profile information for input to a web service; communicating, to the web service, the profile information parsed from the message string; and communicating the message string, as an instant message, from the client device to the recipient. Furthermore, in this aspect of the invention, the input may be audio data representing an utterance and the producing step includes transcribing the utterance to text; the parsing step may be performed by a profile filter; the method may further comprise providing an interface to a user for manual user editing of the transcribed text; the transcription step may be performed at the mobile communication device; the transcription step may be performed by a separate automatic speech recognition system; the audio data may be a voicemail; and the method may further comprise delivering ad impressions to a user based on the parsed text. In variations of this aspect, the recipient may be a cell phone; the recipient may be a smart phone; the recipient may be a PDA; the recipient may be a tablet notebook; the recipient may be a desktop computer; the recipient may be a laptop computer; the recipient may be a web service; the text-based message may be a text message, communicated using Short Message Service; and the text-based message may be an instant message, communicated via an instant message service.

Still another aspect of the invention relates to a method of dynamically providing profile information, derived from message strings, to a web service. An exemplary such method includes establishing a user account configured to interface with a user profile at a web service; thereafter, repeatedly receiving message strings at a profile filter, each message string being representative of a text-based message to be communicated to a recipient; processing each message string, including parsing each message string for profile information appropriate for use by the user profile at the web service; and communicating, to the web service, the profile information parsed from the message strings.

Still yet another aspect of the invention relates to a system for providing profile information, derived from message strings, to a web service. An exemplary such system includes a mobile communication device; an automatic speech recognition engine adapted to transcribe audio data, received as an utterance at the mobile communication device, to text; a user account configured to interface with a user profile at a web service; and a profile filter adapted to parse the transcribed text, according to the configured user account, for profile information appropriate for use at the web service. Furthermore, in this aspect of the invention, the system may further comprise a profile information index, adapted to store profile information, for the user account.

In accordance with another aspect of the present invention, a system is disclosed for parsing and/or filtering message strings of text messages and/or instant messages in order to identify keywords, phrases, or fragments as a function of which user preferences of user profiles are dynamically updated. In accordance with yet another aspect of the present invention, a method is disclosed for parsing and/or filtering message strings of text messages or instant messages in order to identify keywords, phrases, or fragments as a function of which user preferences of user profiles are dynamically updated. In accordance with still yet another aspect of the present invention, software may be provided for parsing and/or filtering message strings of text messages or instant messages in order to identify keywords, phrases, or fragments as a function of which user preferences of user profiles are dynamically updated, as disclosed.

In features of these aspects, the user profiles are associated with user accounts of web services and/or social networking sites; an automatic speech recognition system generates the message strings from audio dictated by a user using a mobile device; and/or the parsing and/or filtering is performed by client side software and/or server side software.

In another feature of these aspects, users can grant, to a contact (e.g., a friend, family member, or associate), access to the user preferences of that user's profile such that the contact can query that user's profile for user profile data of known fields in the user preferences. In further features, the known fields include favorite bands and movies; the query by the contact is performed by sending a message string including an identification of the user and a known field; and/or the query by the contact is performed by sending a text message including an identification of the user and a known field.

In another feature of these aspects, ad impressions may be delivered to a user based on the parsing and/or filtering of one or more message strings of text messages and/or instant messages of the user. In further features, ad impressions are delivered to a user based at least in part on data of the user maintained in the user profile; ad impressions are delivered to a user based at least in part on data of the user maintained in the user profile; and/or an ad impression that is delivered is presented as a text message or an instant message. In still further features, such an ad impression is delivered to a mobile device of an author of a message string and/or presented to an author of a message string prior to sending of the message string as an instant message or text message; and an author of a message string is provided with an option of forwarding an ad impression to a recipient of the message string prior to sending of the message string as an instant message or text message.

In accordance with other aspects of the present invention, an ad impression is delivered to a mobile device for presentation to a user of the mobile device as disclosed herein; a method is provided for delivering an ad impression to a mobile device for presentation to a user of the mobile device as disclosed herein; and a method is provided for granting, by a user to a contact (e.g., a friend, family member, or associate), access to user preferences of that user maintained in a user profile of that user, and querying, by the contact, that user's profile for user profile data of known fields in the user preferences. In features of this latter aspect, the known fields include favorite bands and movies; the query by the contact is performed by sending a message string including an identification of the user and a known field; and/or the query by the contact is performed by sending a text message including an identification of the user and a known field.

In features of these aspects, the user profile may be dynamically updated based on parsing and/or filtering messages strings of text messages and/or instant messages authored by the user; and/or the user profile is static.

In addition to the aforementioned aspects and features of the present invention, it should be noted that the present invention further encompasses the various possible combinations and subcombinations of such aspects and features.

V. BRIEF DESCRIPTION OF THE DRAWINGS

Further aspects, features, embodiments, and advantages of the present invention will become apparent from the following detailed description with reference to the drawings, wherein:

FIG. 8 is a typical header section of an HTTP request from the client in the commercial implementation;

FIG. 9 illustrates exemplary protocol details for a request for a location of a login server and a subsequent response;

FIG. 10 illustrates exemplary protocol details for a login request and a subsequent response;

FIG. 11 illustrates exemplary protocol details for a submit request and a subsequent response;

FIG. 12 illustrates exemplary protocol details for a results request and a subsequent response;

FIG. 13 illustrates exemplary protocol details for an XML hierarchy returned in response to a results request;

FIG. 14 illustrates exemplary protocol details for a text to speech request and a subsequent response;

FIG. 15 illustrates exemplary protocol details for a correct request;

FIG. 16 illustrates exemplary protocol details for a ping request; and

FIG. 17 illustrates exemplary protocol details for a debug request.

VI. DETAILED DESCRIPTION OF THE PREFERRED EMBODIMENTS

Figure 1:
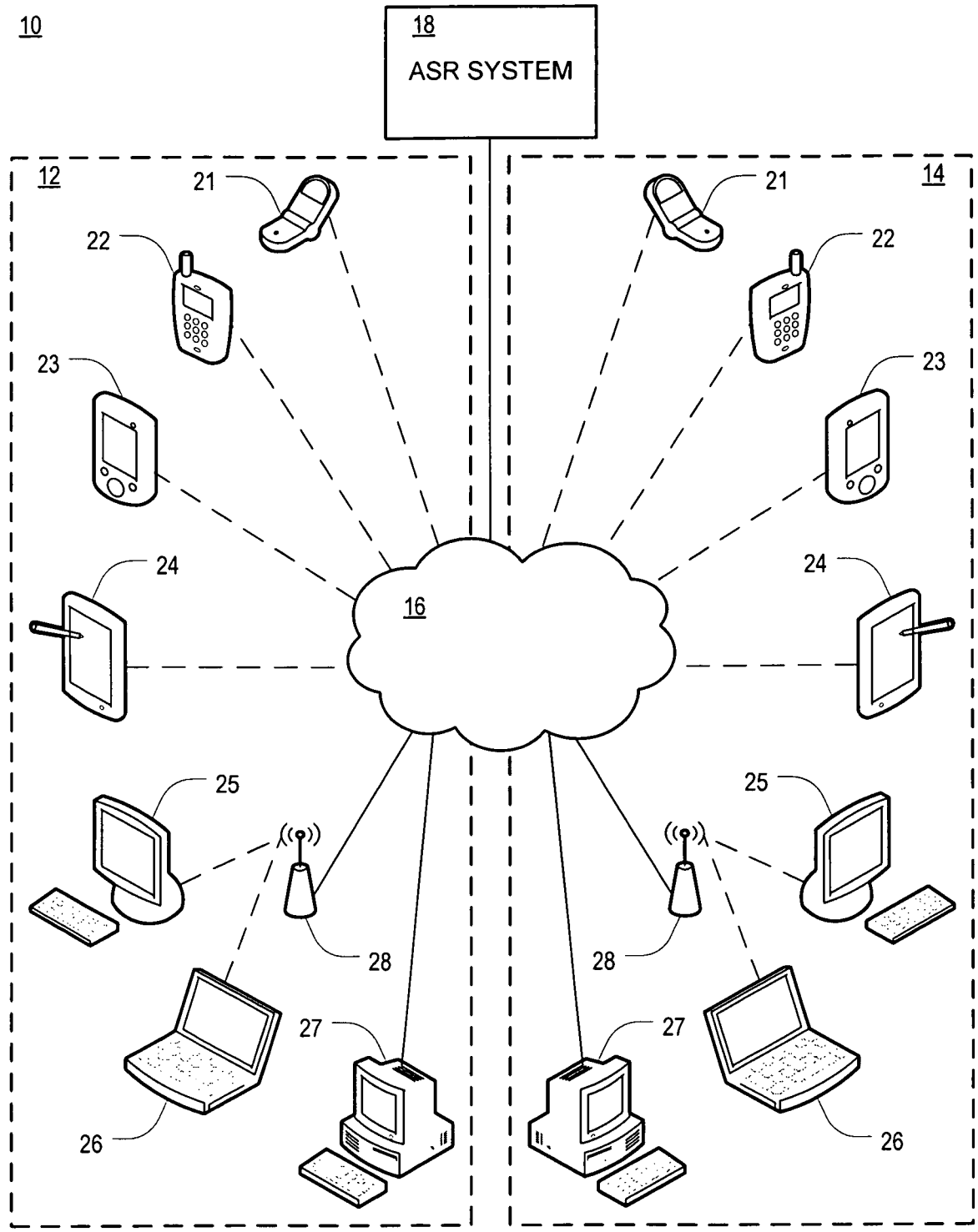
FIG. 1 is a block diagram of a communication system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a communication system 10 in accordance with a preferred embodiment of the present invention. As shown therein, the communication system 10 includes at least one transmitting device 12 and at least one receiving device 14, one or more network systems 16 for connecting the transmitting device 12 to the receiving device 14, and an ASR system 18, including an ASR engine. Transmitting and receiving devices 12,14 may include cell phones 21, smart phones 22, PDAs 23, tablet notebooks 24, various desktop and laptop computers 25,26,27, and the like. One or more of the devices 12,14, such as the illustrated iMac and laptop computers 25,26, may connect to the network systems 16 via wireless access point 28. The various transmitting and receiving devices 12,14 (one or both types of which being sometimes referred to herein as "client devices") may be of any conventional design and manufacture.

Figure 2:
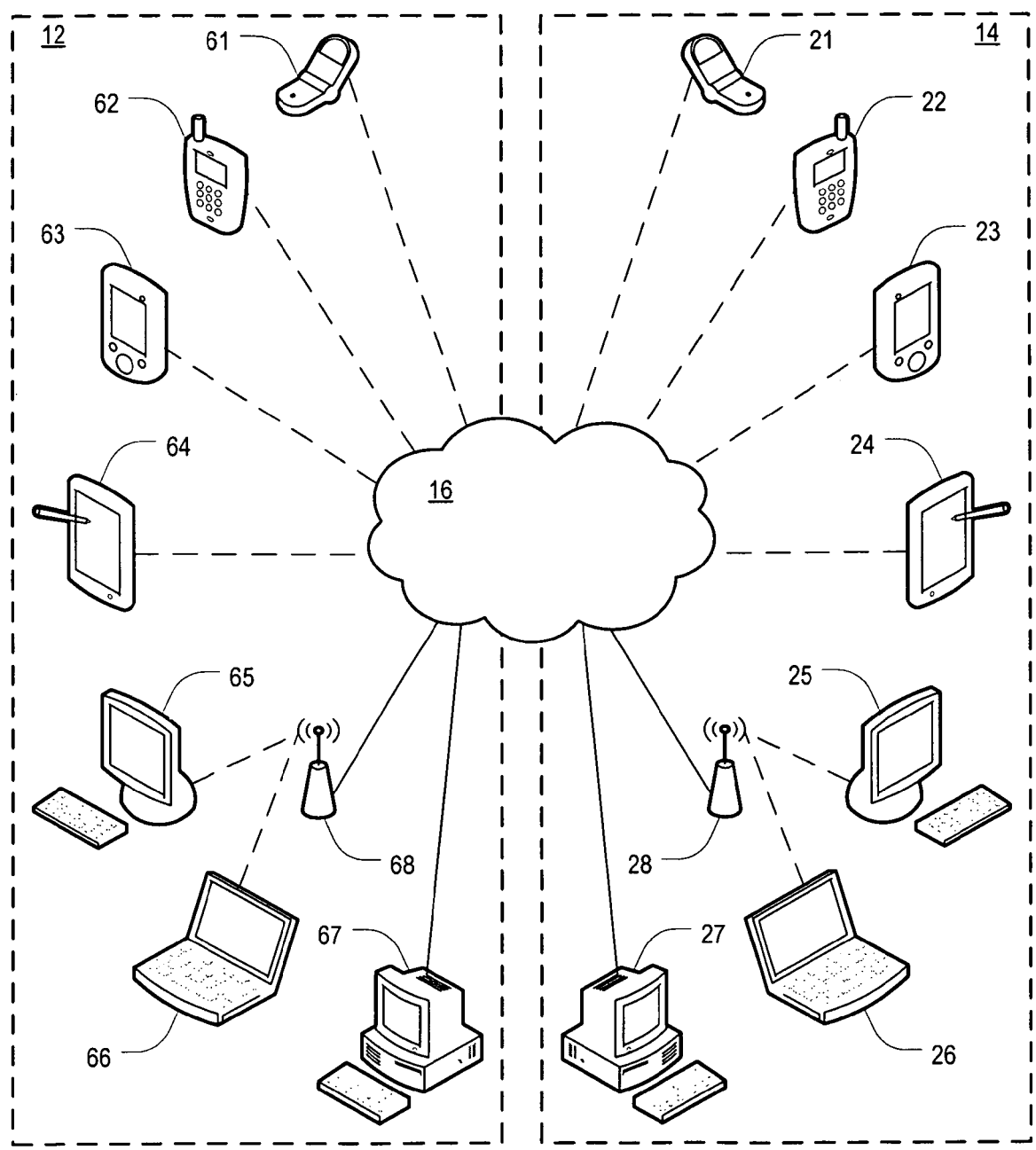
FIG. 2 is a block diagram of a communication system in accordance with another preferred embodiment of the present invention.

FIG. 2 is a block diagram of a communication system 60 in accordance with another preferred embodiment of the present invention. This system 60 is similar to the system 10 of FIG. 1, except that the ASR system 18 of FIG. 1 has been omitted and the ASR engine has instead been incorporated into the various transmitting devices 12, including cell phones 61, smart phones 62, PDAs 63, tablet notebooks 64, various desktop and laptop computers 65,66,67, and the like.

It will be appreciated that the illustrations of FIGS. 1 and 2 are intended primarily to provide context in which the inventive features of the present invention may be placed. A more complete explanation of one or more system architectures implementing such systems is provided elsewhere herein, in the incorporated applications and/or in the incorporated Appendices attached hereto. Furthermore, in the context of text messaging, the communication systems 10,60 each preferably includes, inter alia, a telecommunications network. In the context of instant messaging, the communications systems 10,60 each preferably includes, inter alia, the Internet.

Figure 3:
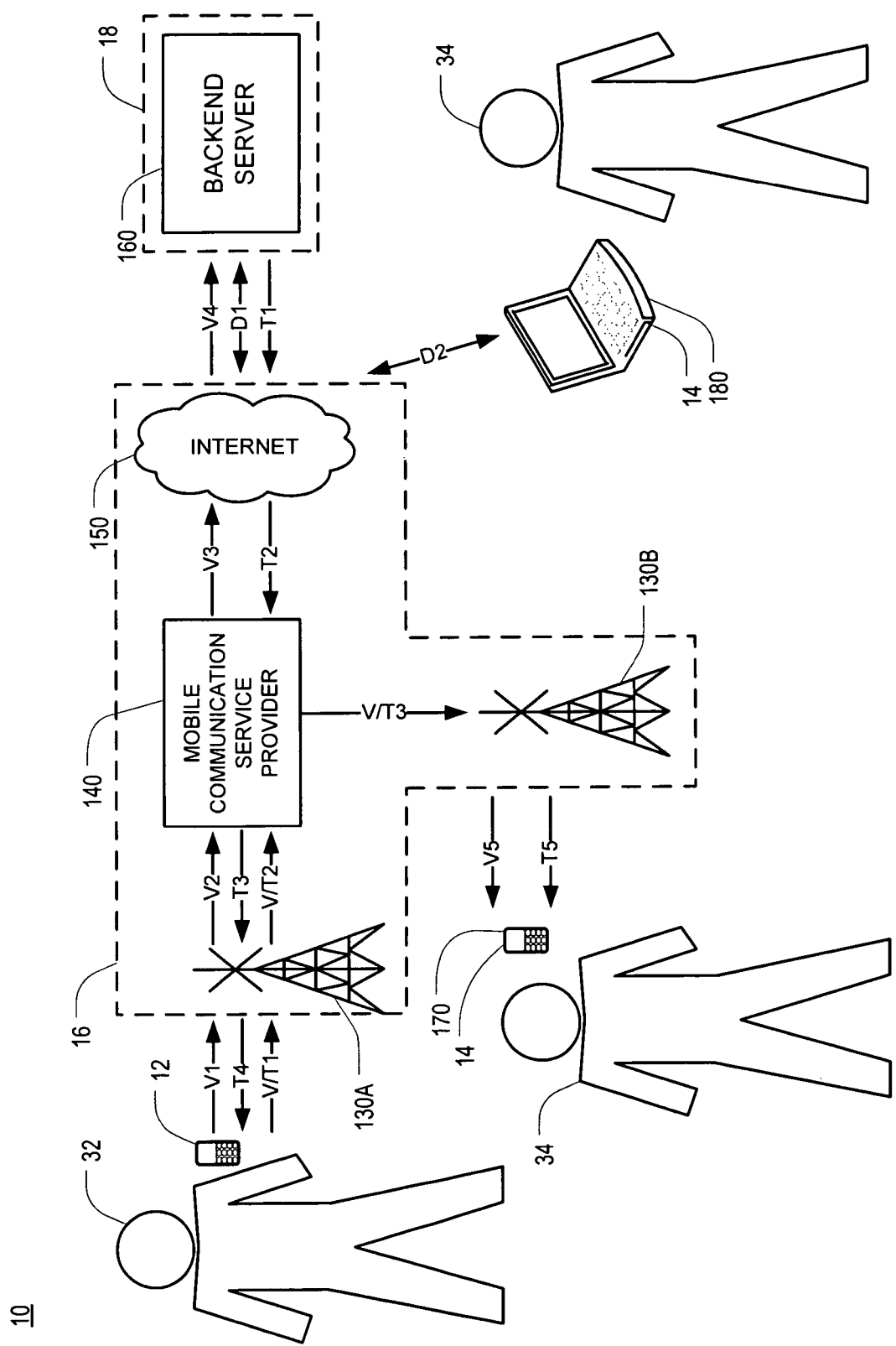
FIG. 3 is a block diagram of an exemplary implementation of the system of FIG. 1.

More particularly, and as described, for example, in the aforementioned U.S. Patent Application Pub. No. US 2007/0239837, FIG. 3 is a block diagram of an exemplary implementation of the system 10 of FIG. 1. In this implementation, the transmitting device 12 is a mobile phone, the ASR system 18 is implemented in one or more backend servers 160, and the one or more network systems 16 include transceiver towers 130, one or more mobile communication service providers 140 (operating or joint or independent control) and the Internet 150. The backend server 160 is or may be placed in communication with the mobile phone 12 via the mobile communication service provider 140 and the Internet 150. The mobile phone has a microphone, a speaker and a display.

A first transceiver tower 130A is positioned between the mobile phone 12 (or the user 32 of the mobile phone 12) and the mobile communication service provider 140, for receiving an audio message (V1), a text message (T1) and/or a verified text message (V/T1) from one of the mobile phone 12 and the mobile communication service provider 140 and transmitting it (V2, T1, V/T1) to the other of the mobile phone 12 and the mobile communication service provider 140. A second transceiver tower 130B is positioned between the mobile communication service provider 140 and mobile devices 170, generally defined as receiving devices 14 equipped to communicate wirelessly via mobile communication service provider 140, for receiving a verified text message (V/T1) from the mobile communication service provider 140 and transmitting it (V5 and T1) to the mobile devices 170. In at least some embodiments, the mobile devices 170 are adapted for receiving a text message converted from an audio message created in the mobile phone 12. Additionally, in at least some embodiment, the mobile devices 170 are also capable of receiving an audio message from the mobile phone 12. The mobile devices 170 include, but are not limited to, a pager, a palm PC, a mobile phone, or the like.

The system 10 also includes software, as disclosed below in more detail, installed in the mobile phone 12 and the backend server 160 for causing the mobile phone 12 and/or the backend server 160 to perform the following functions. The first step is to initialize the mobile phone 12 to establish communication between the mobile phone 12 and the backend server 160, which includes initializing a desired application from the mobile phone 12 and logging into a user account in the backend server 160 from the mobile phone 12. Then, the user 32 presses and holds one of the buttons of the mobile phone 12 and speaks an utterance, thus generating an audio message, V1. At this stage, the audio message V1 is recorded in the mobile phone 12. By releasing the button, the recorded audio message V1 is sent to the backend server 160 through the mobile communication service provider 140.

In the exemplary embodiment of the present invention as shown in FIG. 3, the recorded audio message V1 is first transmitted to the first transceiver tower 130A from the mobile phone 12. The first transceiver tower 130A outputs the audio message V1 into an audio message V2 that is, in turn, transmitted to the mobile communication service provider 140. Then the mobile communication service provider 140 outputs the audio message V2 into an audio message V3 and transmits it (V3) to the Internet 150. The Internet 150 outputs the audio message V3 into an audio message V4 and transmits it (V4) to the backend server 160. The content of all the audio messages V1-V4 is identical.

The backend server 160 then converts the audio message V4 into a text message, T1, and/or a digital signal, D1, in the backend server 160 by means of a speech recognition algorithm including a grammar algorithm and/or a transcription algorithm. The text message T1 and the digital signal D1 correspond to two different formats of the audio message V4. The text message T1 and/or the digital signal D1 are sent back to the Internet 150 that outputs them into a text message T1 and a digital signal D2, respectively.

The digital signal D2 is transmitted to a digital receiver 180, generally defined as a receiving device 14 equipped to communicate with the Internet and capable of receiving the digital signal D2. In at least some embodiments, the digital receiver 180 is adapted for receiving a digital signal converted from an audio message created in the mobile phone 12. Additionally, in at least some embodiments, the digital receiver 180 is also capable of receiving an audio message from the mobile phone 12. A conventional computer is one example of a digital receiver 180. In this context, a digital signal D2 may represent, for example, an email or instant message.

It should be understood that, depending upon the configuration of the backend server 160 and software installed on the mobile phone 12, and potentially based upon the system set up or preferences of the user 32, the digital signal D2 can either be transmitted directly from the backend server 160 or it can be provided back to the mobile phone 12 for review and acceptance by the user 32 before it is sent on to the digital receiver 180.

The text message T1 is sent to the mobile communication service provider 140 that outputs it (T1) into a text message T1. The output text message T1 is then transmitted to the first transceiver tower 130A. The first transceiver tower 130A then transmits it (T1) to the mobile phone 12 in the form of a text message T1. It is noted that the substantive content of all the text messages T1-T1 may be identical, which are the corresponding text form of the audio messages V1-V4.

Upon receiving the text message T1, the user 32 verifies it and sends the verified text message V/T1 to the first transceiver tower 130A that in turn, transmits it to the mobile communication service provider 140 in the form of a verified text V/T1. The verified text V/T1 is transmitted to the second transceiver tower 130B in the form of a verified text V/T1 from the mobile communication service provider 140. Then, the transceiver tower 130B transmits the verified text V/T1 to the mobile devices 170.

In at least one implementation, the audio message is simultaneously transmitted to the backend server 160 from the mobile phone 12, when the user 32 speaks to the mobile phone 12. In this circumstance, it is preferred that no audio message is recorded in the mobile phone 12, although it is possible that an audio message could be both transmitted and recorded.

Such a system may be utilized to convert an audio message into a text message. In at least one implementation, this may be accomplished by first initializing a transmitting device so that the transmitting device is capable of communicating with a backend server 160. Second, a user 32 speaks to or into the client device so as to create a stream of an audio message. The audio message can be recorded and then transmitted to the backend server 160, or the audio message can be simultaneously transmitted to the backend server 160 through a client-server communication protocol. Streaming may be accomplished according to processes described elsewhere herein and, in particular, in FIG. 4, and accompanying text, of the aforementioned U.S. Patent Application Pub. No. US 2007/0239837. The transmitted audio message is converted into the text message in the backend server 160. The converted text message is then sent back to the client device 12. Upon the user's verification, the converted text message is forwarded to one or more recipients 34 and their respective receiving devices 14, where the converted text message may be displayed on the device 14. Incoming messages may be handled, for example, according to processes described elsewhere herein and, in particular, in FIG. 2, and accompanying text, of the aforementioned U.S. Patent Application Pub. No. US 2007/0239837.

Still further, in at least one implementation, one or both types of client device 12,14 may be located through a global positioning system (GPS); and listing locations, proximate to the position of the client device 12,14, of a target of interest may be presented in the converted text message.

Figure 4:
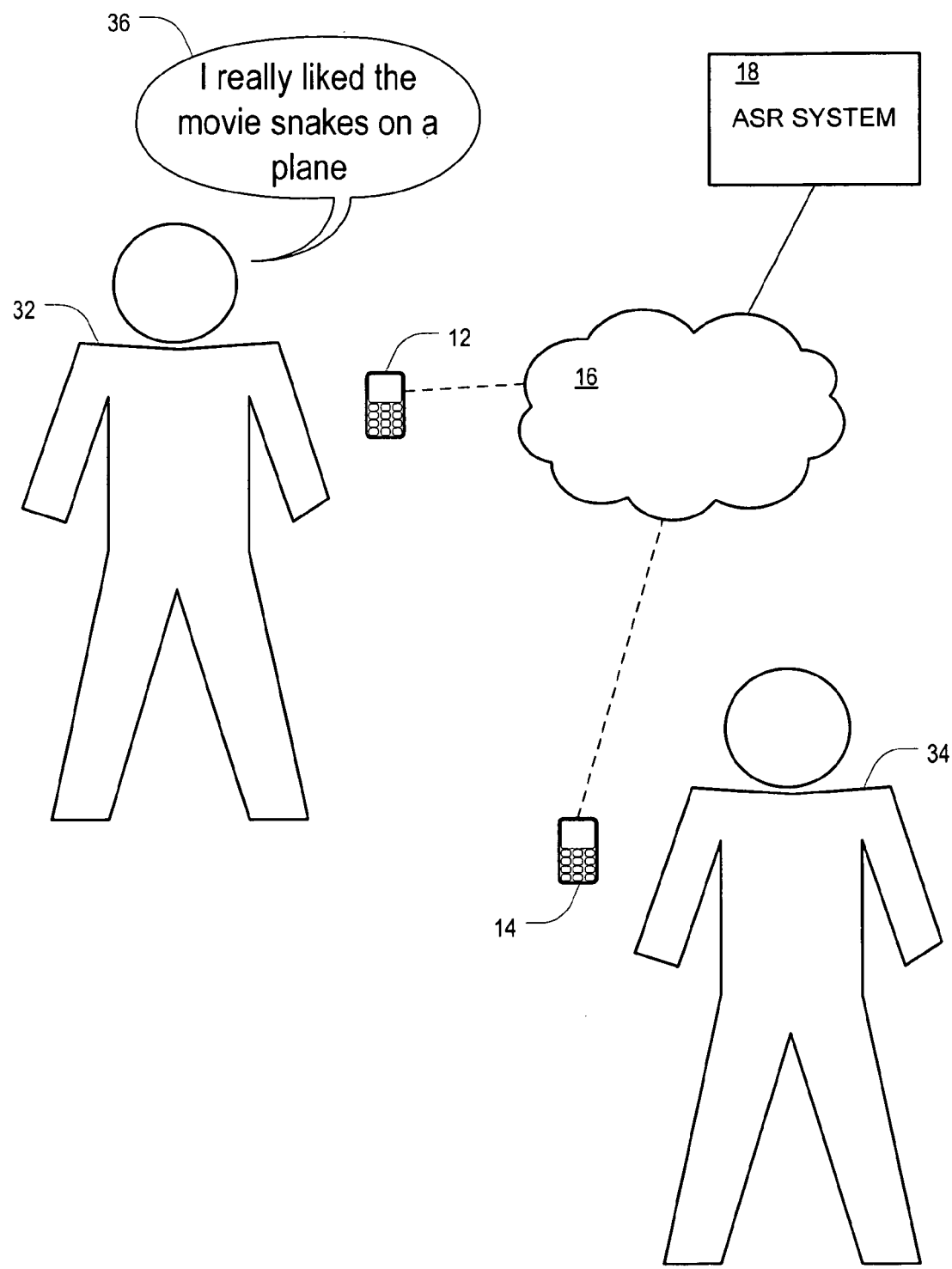
FIG. 4 is a schematic diagram illustrating communications between two users via a portion of the communication system of FIGS. 1 and 3.

FIG. 4 is a block diagram illustrating communications between two users 32,34 via a portion of the communication system 10 of FIGS. 1 and 3. As shown therein, a first user 32, sometimes referred to herein as a transmitting user, is communicating with a second user 34, sometimes referred to herein as a receiving user, by way of respective transmitting and receiving devices 12,14. In the context of text messaging, the transmitting user 32 may send text messages using his transmitting device 12, for example via SMS, and the receiving user 34 receives text messages on his receiving device 14, in this case also via SMS. In the context of instant messaging, the transmitting user 32 may send instant messages via an IM client using his transmitting device 12, and the receiving user 34 receives instant messages on his receiving device 14 via an IM client. In either case, the transmitting user 32 preferably speaks into his transmitting device 12 with his utterances being converted to text for communicating to the receiving device 14, all as more fully described hereinbelow.

When the first user 32 speaks an utterance 36 into the transmitting device 12, the recorded speech audio is sent to the ASR system 18, as described previously. In the example of FIG. 4, the utterance 36 is "I really liked the movie snakes on a plane." The ASR engine in the ASR system 18 attempts to recognize and transcribe the utterance 36 into text. Speech recognition requests received by the ASR engine may be handled, for example, according to processes described elsewhere herein and, in particular, in FIG. 3, and accompanying text, of the aforementioned U.S. Patent Application Pub. No. US 2007/0239837. Further, speech recognition may be carried out, for example, according to processes described elsewhere herein and, in particular, in FIGS. 6A-6H, and accompanying text, of the aforementioned U.S. Patent Application Pub. No. US 2007/0239837.

Furthermore, in converting speech to text, speech transcription performance indications may be provided to the receiving user 34 in accordance with the disclosure of the aforementioned U.S. patent application Ser. No. 12/197,213.

Additionally, in the context of SMS and/or IM messaging, the ASR system preferably makes use of both statistical language models (SLMs) for returning results from the audio data, and finite grammars used to post-process the text results, in accordance with the disclosure of the aforementioned U.S. patent application Ser. No. 12/198,112. This is believed to result in messages that are formatted in a way that looks more typical of how a human would have typed the message using a mobile device.

It will be appreciated that automated transcription of recorded utterances 36 is useful in other environments and applications as well. For example, in another system (not separately illustrated), a user speaks an utterance 36 into a device as a voicemail, and the recorded speech audio is sent to the ASR system 18. Other applications to which the teachings of the present invention may be applicable will be apparent to the Ordinary Artisan.

Figure 5:
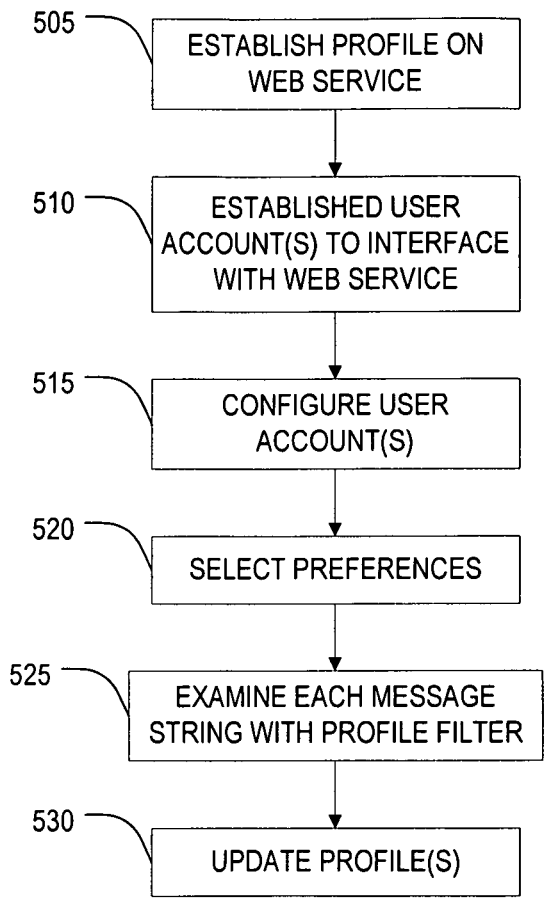
FIG. 5 is a flowchart illustrating a method of updating profile information in a web service in accordance with one or more preferred embodiments of the present invention.

FIG. 5 is a flowchart illustrating a method of updating profile information in a web service in accordance with one or more preferred embodiments of the present invention. Such a method may begin at step 505 with the creation of a profile at each of one or more web services. As used herein, "web service" may include any website at which user-specific "profile" information is established and maintained by the user, and includes, by way of example, websites offered by Amazon, Facebook, and MySpace. Such information may include personal data, favorites, likes and dislikes, or the like.

At step 510, one or more accounts are established for interfacing to user profiles established at the various web services. Such accounts may be established at the backend server 160/ASR system 18, the user's client device 12,14, or both. Accounts may be designated in any of a variety of ways. For example, a user may maintain one account for text messages and one for IMs, or may maintain a single unified account for both types of messages.

With one or more accounts established, the account or accounts are next configured at step 515 to interface with the user profile at each web service. In one embodiment, such configuration may be effected by the user by selecting one or more web services from a list of available web services displayed on the client device 12,14, while in another embodiment, such configuration may be effected by the user by using a browser on the client device 12,14 to access the web service and select an option for such configuration from the web service. Furthermore, in at least one embodiment, each web service makes use of a standard protocol by which one or both of the backend server 160/ASR system 18 and the user's device 12,14 may communicate with the web service to update the user profile. In another embodiment, a browser on the client device 12,14 may be utilized to access the web service and download a protocol specific to that web service. Preferably, the various configurations are organized and managed in one or more user accounts that correspond, for example, to the client device 12,14.

At step 520, preferences may be established for the configuration. These may, for example, be established directly via a user interface at the client device 12,14 or indirectly at the web service via a browser on the client device 12,14 or via a browser on a separate device. Preferences may include types of filters or the like to be employed as part of a "profile filter" described below, groups of web service profiles to be updated, message types (e.g., text messages, IMs, other messages, or the like, or a combination thereof) or utterance types to be considered, and the like. In at least one embodiment, default preferences are provided and utilized until if and when the user chooses to update the preferences.

Once the user's account or accounts are configured and appropriate preferences have been established, the method may be used to examine message strings for relevant information as shown at step 525. In conjunction with this method, the backend server 160/ASR system 18 may further include a profile filter for processing the text results thereof. Specifically, as transcribed text result is produced by the ASR system 18, whether the result is a message for communication to one or more other users and/or to one or more web services, or is some other type of transcription, the transcribed text result is parsed in order to identify keywords, fragments, or phrases that may represent relevant personal preference information. Such identification process may include, for example, keyword or grammar lookups, natural language understanding, semantic analysis, or other techniques in order to derive interestingness for further processing. The filter may constitute, at least in part, one or more of those filters found in the disclosure of one or more of the patent applications incorporated by reference herein.

In such case, the identification process also may include audio fingerprinting or audio watermarking, which may involve placing human-inaudible audio artifacts in an audio stream that can carry identification or configuration information. Audio fingerprinting or audio watermarking may help the backend server 160/ASR system 18 select the type of noise suppression done or may help it select from a given acoustic model (for example, by providing an indication as to what accent an individual is most likely to have). This may be particularly useful for client-less applications such as voicemail, where the chipset can tag these things which are eventually picked up by the backend server 160/ASR system 18 after it traverses the normal carrier audio factories. It may be desirable to have hidden parameters that would normally be passed if the audio data originated from a corresponding application on a client device.

Alternatively, a profile filter may be implemented on the client device 12,14, whether or not an ASR engine is present in the device 12,14. Still further, it will be appreciated that, in the context of text messaging, a profile filter may be implemented at the mobile communication service provider 140, and in the context of instant messaging, a profile filter may be implemented at an IM service provider (not specifically illustrated).

A separate ASR system 18 provides a convenient platform at which the profile filter may be disposed. However, a profile filter may additionally or alternatively be disposed at a transmitting device 12. In this arrangement, after transcription results are returned by an ASR engine (which may be part of an ASR system 18, may be included in the transmitting device 12, or may be included in the mobile communication service provider 140 or IM service provider) to the transmitting device 12, the transmitting user 32 can use a keyboard, keypad or other user input device on the transmitting device 12 to manually edit the transcription results before transmission. Alternatively, if the transcription results are particularly inaccurate, the user may choose to enter the entire intended message using such user input device on the transmitting device 12. In either case, the manually-edited or -created message may then be processed by a profile filter on the transmitting device 12.

In at least one embodiment, a profile filter may be implemented at a receiving device 14, such that incoming text messages, IMs and other message strings may be processed in a manner similar to that of transcribed utterances or outgoing messages strings.

Once the profile filter or the like has processed the message string, web service user profiles that are linked to the user account(s) can then be updated dynamically at step 530 as a function of the keywords, fragments, or phrases identified at step 525.

It is believed that such dynamic personalization will alleviate or even completely replace the need for users to manually update much of the profile information contained in user profiles linked to such user accounts, and that the accuracy of web service targeting and recommendation engines can be dynamically improved based on user text messaging, instant messaging and other message strings. Such information instead can be updated on the fly by the users simply linking their user profiles at such web services to their client device user account(s). For example, a user's preferences at social networking sites such as Facebook and MySpace can be dynamically updated based on that user's message strings without requiring that user to log into the user's account at each site or to modify and save the data in the user profile for the account. Similarly, user profiles associated with web services using recommendation engines, such as that utilized by Amazon, can be dynamically updated based on that user's message strings without requiring that user to manually update the profiles. Thus, as a result of the present invention, static profiles can be avoided.

In the illustrative example of FIG. 4, if two or more users are communicating via instant messaging or text messaging, and one user 32 speaks the utterance 36 "I really liked the movie snakes on a plane" into the transmitting device 12, the message is first transcribed by the ASR engine and then processed by the profile filter. Assuming an accurate transcription is obtained, then as the message passes through the profile filter, the keyword "movie" may be identified and the phrase "snakes on a plane" may be further identified using a client, server, or web based database of current and past movies. Analysis of the message string further indicates that there is some likelihood that the user has an interest in the movie "Snakes on a Plane." If the user's preferences have been set to take action when this type of information (the type of message, the existence of the user's interest, the name or type of movie, or the like) is identified (or alternatively, if the user's preferences have been set to look for this type of information to begin with), then such interest in the movie "Snakes on a Plane" is dynamically posted, as appropriate, to the user's social networking profile pages that are linked to the user's client device account(s). As noted previously, the user's account on the client device 12,14 may be an instant messaging account, a text messaging account, a unified account, or the like. Such dynamic updating of the user's social network profile page then would enable their contacts (having suitable permissions to access this data) to ask for that user's favorite films and get an automated response from this dynamically populated information.

In addition to the foregoing dynamic updating of the user's profile information, ad impressions further can be targeted to the user based on the identified keyword and phrase, such as ad impressions relating to movie rentals for "Snakes on a Plane" or movie times of a local theater for showings of "Snakes on a Plane." The advertisements may be pushed either prior to message strings actually being sent to recipients or to web services, or thereafter, as applicable.

The advertising that is pushed to a user's mobile device preferably comprises an ad impression that is displayed to the user in the form of an ad bubble. The ad impression elements may contain text, graphics, videos, and/or audio and may be downloaded from a server infrastructure or may already be resident within the mobile device and accessed directly there from. Preferably, each ad impression is designed to be as unobtrusive as possible to the user and allows the user to view or hear the advertisement or take some further action regarding the advertisement, if and as desired by the user, which may include opening a separate mobile browser with additional content relevant to the advertisement.

The ad impression may be delivered only to the author of the message string. Alternatively, the ad impression may be delivered both to the author of the message string and to the intended recipient of the message string, especially where the message string is intended to be sent to the mobile device of another user. Moreover, if the ad impression is sent to either of, but not both of, the author and intended recipient, then such person may be provided with the option of conveniently forwarding the ad impression to the other person if desired, whether by text message, instant message, email, hyperlink, or injection of the ad impression into a message string itself.

In taking further action with regard to an ad impression that is presented to a user, if desired, such user having seen or heard the ad impression may manually click on a displayed advertisement or portion thereof resulting in, for example, the launch of a mobile browser. The mobile browser may then allow the user to either complete a purchase or find relevant information associated with the advertisement. Moreover, rather than manually clicking on the displayed advertisement, the user may speak a keyword as a "voice click," thereby resulting in the further action being taken. Such use of "voice click" may be in accordance with the disclosure of the aforementioned U.S. patent application Ser. No. 12/198,116, which is hereby incorporated herein by reference.

In the dynamic updating of the user's profile information at one or more web services, use may be made of one or more indexes for storing, in association with the particular user involved, some or all of the profile information that has been parsed from the message string. The index or indexes may include databases, grammars, language models, or the like. As profile information is identified, it may be stored in the appropriate index. If no index exists for the particular user, then it may be created automatically as profile information for the user is gathered.

In some embodiments, the index or indexes are stored at the backend server 160/ASR system 18 and updated directly by the profile filter or other element of the system 18. In at least one embodiment, corresponding indexes are maintained on the client devices 12,14 and synchronized at appropriate times with the system index. Synchronization may be accomplished by transmitting, from the client device 12,14 to the system 18, a delta model representing the differences between the new client device indexes (as updated most recently with profile information) and the last-synchronized information in the client device indexes. Use of delta models enables time and bandwidth to be conserved in the synchronization process. Still further, in at least one other embodiment, the indexes are maintained only on the client devices 12,14.

In some embodiments, the index or indexes may be used as a specific interface point for the web services where the user maintains profiles to be updated according to one or more of the methods and systems disclosed herein. More particularly, updated profile information may be placed in the index or indexes, and a separate process may be used to provide profile information from the index or indexes to the web services. These two separate processes may occur synchronously or asynchronously.

Further, the index(es) may be updated to include static profile information as well as the dynamic profile information derived as described herein.

In some embodiments, the index or indexes may be separately queried by one or more users. Any of a variety of means may be utilized to establish which users are to be given access to some or all of a particular user's profile information in the index(es). In one embodiment, any user (or corresponding user device) in a particular user's contact list, as stored in the particular user's client device 12,14, may be permitted to query the index(es). In particular, in accordance with one or more methods of the present invention, a user's contacts are allowed to query the user's preferences whereby they ask for areas of known content, such as the user's favorite bands or movies. As noted previously, the preferences/profile information could include both dynamic profile information and static profile information. This blend of static and dynamic profile data could also be utilized to target ads and/or promotions.

In an example of the foregoing, the first user 32 in FIG. 4 may have established preferences, at step 520 in FIG. 5, for movie preferences to be included in his or her profile information and maintained in an index maintained for him or her. Thereafter, a transcription of the utterance 36 of first user 32 in FIG. 4 (or in at least some embodiments, a manually-entered message string similar thereto) may trigger an additional entry in the profile information index for that user 32, where the entry indicates an interest in the movie "Snakes on a Plane." If another user, authorized by the first user 32 to query profile information in the first user's profile information index, subsequently wishes to learn what movies the first user 32 likes (perhaps as part of researching an appropriate birthday gift or the like), the other user may query the profile information index. The query may be accomplished via a plain language query (for example, using manually-entered text or making use of the ASR engine), via a special user interface, or any other suitable means.

Commercial Implementation

One commercial implementation of the foregoing principles is the Yap® and Yap9™ service (collectively, "the Yap service"), available from Yap Inc. of Charlotte, N.C. The Yap service includes one or more web applications and a client device application. The Yap web application is a J2EE application built using Java 5. It is designed to be deployed on an application server like IBM WebSphere Application Server or an equivalent J2EE application server. It is designed to be platform neutral, meaning the server hardware and OS can be anything supported by the web application server (e.g. Windows, Linux, MacOS X).

Figure 6:
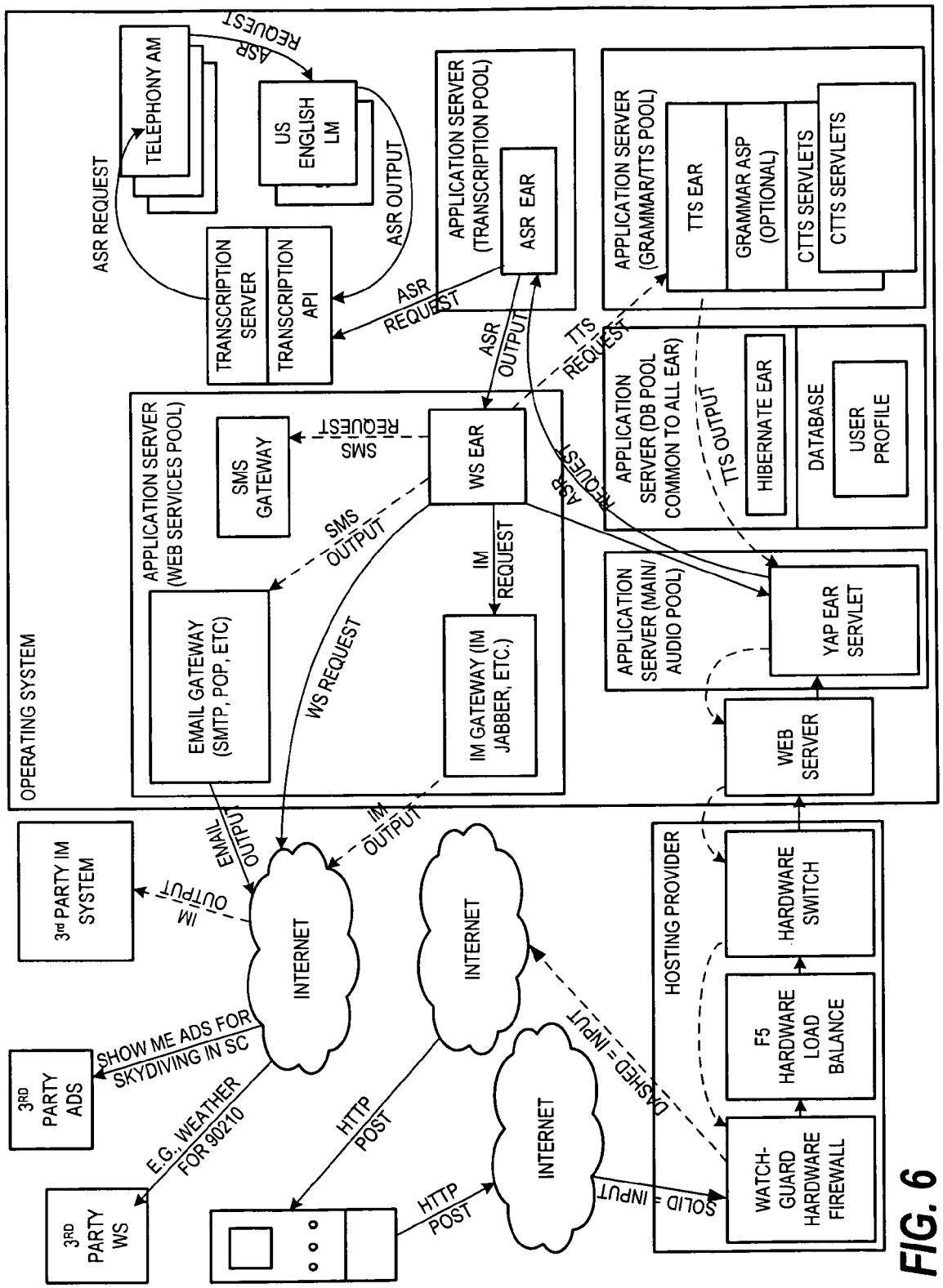
FIG. 6 is a block diagram of the system architecture of one commercial implementation.

FIG. 6 is a block diagram of the system architecture of the Yap commercial implementation. With reference to FIG. 6, the operating system may be implemented in Red Hat Enterprise Linux 5 (RHEL 5); the application servers may include the Websphere Application Server Community Edition (WAS-CE) servers, available from IBM; the web server may be an Apache server; the CTTS Servlets may include CTTS servlets from Loquendo, including US/UK/ES male and US/UK/ES female; the Grammar ASP may be the latest WebSphere Voice Server, available from IBM; suitable third party ads may be provided by Google; a suitable third party IM system is Google Talk, available from Google; and a suitable database system is the DB2 Express relational database system, available from IBM.

Figure 7:
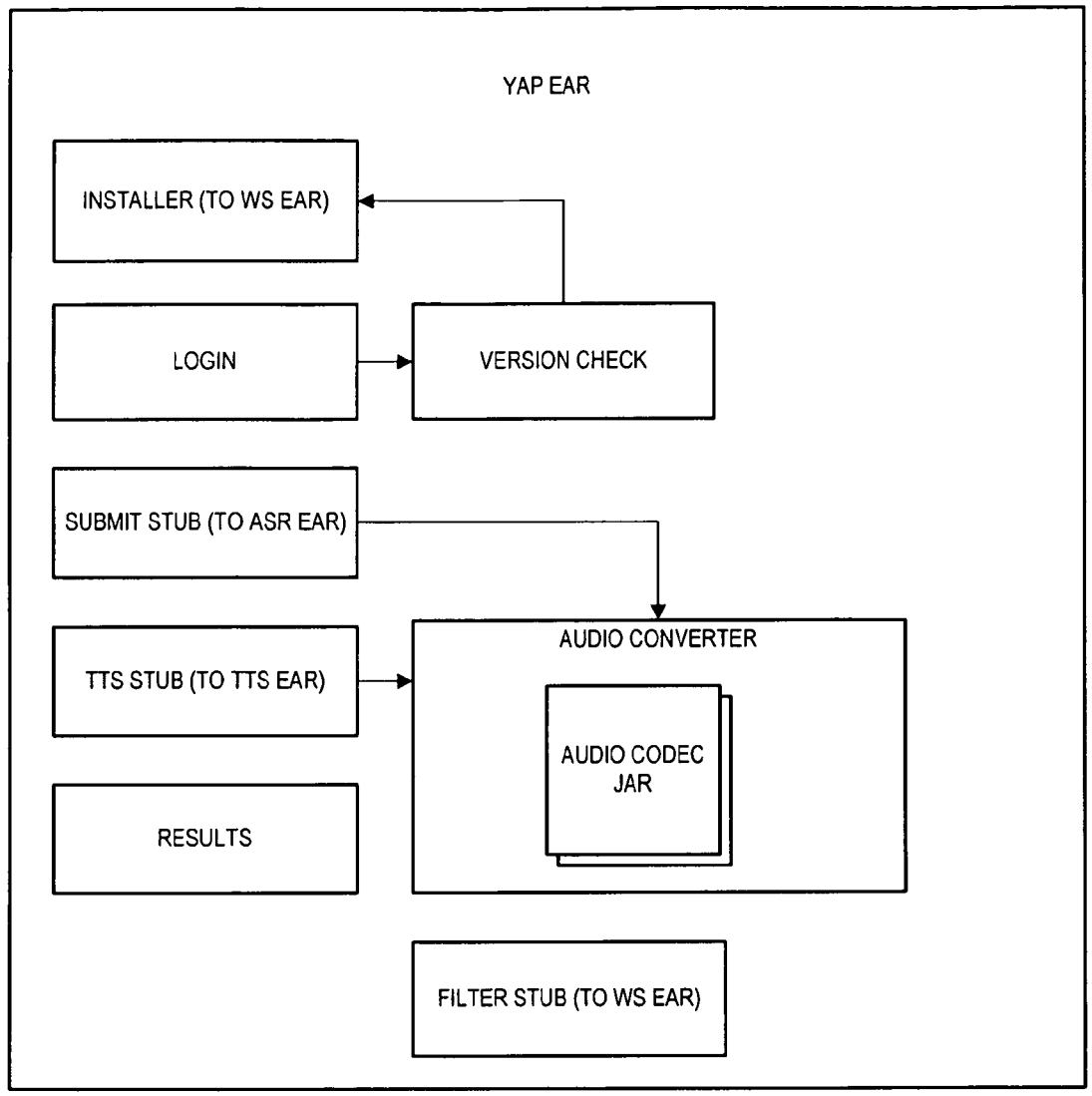
FIG. 7 is a block diagram of a portion of FIG. 6.

FIG. 7 is a block diagram of the Yap EAR of FIG. 6. The audio codec JARs may include the VoiceAge AMR JAR, available from VoiceAge of Montreal, Quebec and/or the QCELP JAR, available from Qualcomm of San Diego, Calif.

The Yap web application includes a plurality of servlets. As used herein, the term "servlet" refers to an object that receives a request and generates a response based on the request. Usually, a servlet is a small Java program that runs within a Web server. Servlets receive and respond to requests from Web clients, usually across HTTP and/or HTTPS, the HyperText Transfer Protocol. Currently, the Yap web application includes nine servlets: Correct, Debug, Install, Login, Notify, Ping, Results, Submit, and TTS. Each servlet is described below in the order typically encountered.

The communication protocol used for all messages between the Yap client and Yap server applications is HTTP and HTTPS. Using these standard web protocols allows the Yap web application to fit well in a web application container. From the application server's point of view, it cannot distinguish between the Yap client midlet and a typical web browser. This aspect of the design is intentional to convince the web application server that the Yap client midlet is actually a web browser. This allows a user to use features of the J2EE web programming model like session management and HTTPS security. It is also an important feature of the client as the MIDP specification requires that clients are allowed to communicate over HTTP.

More specifically, the Yap client uses the POST method and custom headers to pass values to the server. The body of the HTTP message in most cases is irrelevant with the exception of when the client submits audio data to the server in which case the body contains the binary audio data. The Server responds with an HTTP code indicating the success or failure of the request and data in the body which corresponds to the request being made. Preferably, the server does not depend on custom header messages being delivered to the client as the carriers can, and usually do, strip out unknown header values. FIG. 8 is a typical header section of an HTTP request from the Yap client.

The Yap client is operated via a user interface (UI), known as "Yap9," which is well suited for implementing methods of converting an audio message into a text message and messaging in mobile environments. Yap9 is a combined UI for SMS and web services (WS) that makes use of the buttons or keys of the client device by assigning a function to each button (sometimes referred to as a "Yap9" button or key). Execution of such functions is carried out by "Yap-lets." This process, and the usage of such buttons, are described elsewhere herein and, in particular, in FIGS. 9A-9D, and accompanying text, of the aforementioned U.S. Patent Application Pub. No. US 2007/0239837.

Usage Process—Install:

Installation of the Yap client device application is described in the aforementioned U.S. Patent Application Pub. No. US 2007/0239837 in a subsection titled "Install Process" of a section titled "System Architecture."

Usage Process—Notify:

When a Yap client is installed, the install fails, or the install is canceled by the user, the Notify servlet is sent a message by the phone with a short description. This can be used for tracking purposes and to help diagnose any install problems.

Usage Process—Login:

When the Yap midlet is opened, the first step is to create a new session by logging into the Yap web application using the Login servlet. Preferably, however, multiple login servers exist, so as a preliminary step, a request is sent to find a server to log in to. Exemplary protocol details for such a request can be seen in FIG. 9. An HTTP string pointing to a selected login server will be returned in response to this request. It will be appreciated that this selection process functions as a poor man's load balancer.

After receiving this response, a login request is sent. Exemplary protocol details for such a request can be seen in FIG. 10. A cookie holding a session ID is returned in response to this request. The session ID is a pointer to a session object on the server which holds the state of the session. This session data will be discarded after a period determined by server policy.

Sessions are typically maintained using client-side cookies, however, a user cannot rely on the set-cookie header successfully returning to the Yap client because the carrier may remove that header from the HTTP response. The solution to this problem is to use the technique of URL rewriting. To do this, the session ID is extracted from the session API, which is returned to the client in the body of the response. This is called the "Yap Cookie" and is used in every subsequent request from the client. The Yap Cookie looks like this:

;jsessionid=C240B217F2351E3C420A599B0878371A

All requests from the client simply append this cookie to the end of each request and the session is maintained:
/Yap/Submit;
  jsessionid=C240B217F2351E3C420A599B0878371A Usage Process—Submit:

After receiving a session ID, audio data may be submitted. The user presses and holds one of the Yap-9 buttons, speaks aloud, and releases the pressed button. The speech is recorded, and the recorded speech is then sent in the body of a request to the Submit servlet, which returns a unique receipt that the client can use later to identify this utterance. Exemplary protocol details for such a request can be seen in FIG. 11.

One of the header values sent to the server during the login process is the format in which the device records. That value is stored in the session so the Submit servlet knows how to convert the audio into a format required by the ASR engine. This is done in a separate thread as the process can take some time to complete.

The Yap9 button and Yap9 screen numbers are passed to the Submit server in the HTTP request header. These values are used to lookup a user-defined preference of what each button is assigned to. For example, the 1 button may be used to transcribe audio for an SMS message, while the 2 button is designated for a grammar based recognition to be used in a web services location based search. The Submit servlet determines the appropriate "Yaplet" to use. When the engine has finished transcribing the audio or matching it against a grammar, the results are stored in a hash table in the session.

In the case of transcribed audio for an SMS text message, a number of filters can be applied to the text returned from the ASR engine. Such filters may include, but are not limited to, those shown Table 3.

TABLE 3

| Filter Type | Function |
| --- | --- |
| Ad Filter | Used to scan the text and identify keywords that can be used to insert targeted advertising messages, and/or convert the keywords into hyperlinks to ad sponsored web pages |
| Currency Filter | Used to format currency returned from the speech engine into the user's preferred format. (e.g., "one hundred twenty dollars" -> "$120.00") |
| Date Filter | Used to format dates returned from the speech engine into the user's preferred format. (e.g., "march fourth two thousand seven" -> "3/4/2007") |
| Digit Filter | User to format spelled out single digits returned from the speech engine into a multi-digit number such as a zip code (e.g., "two eight two one one" -> "28211") |
| Engine Filter | Used to remove speech engine words |
| Number Filter | Used to convert the spelled out numbers returned from the speech engine into a digit based number (e.g., "one hundred forty seven" -> "147") |
| Obscenity Filter | Used to place asterisks in for the vowels in street slang (e.g., "sh*t", "f*ck", etc.) |
| Punctuation Filter | Used to format punctuation |
| SMS Filter | Used to convert regular words into a spelling which more closely resembles an SMS message (e.g., "don't forget to smile" -> "don't 4get 2 :)", etc.) |
| Time Filter | Used to format time phrases |

Notably, after all of the filters are applied, both the filtered text and original text are returned to the client so that if text to speech is enabled for the user, the original unfiltered text can be used to generate the TTS audio.

Usage Process—Results:

The client retrieves the results of the audio by taking the receipt returned from the Submit servlet and submitting it as a request to the Results servlet. Exemplary protocol details for such a request can be seen in FIG. 12. This is done in a separate thread on the device and a timeout parameter may be specified which will cause the request to return after a certain amount of time if the results are not available. In response to the request, a block of XML is preferably returned. Exemplary protocol details for such a return response can be seen in FIG. 13. Alternatively, a serialized Java Results object may be returned. This object contains a number of getter functions for the client to extract the type of results screen to advance to (i.e., SMS or results list), the text to display, the text to be used for TTS, any advertising text to be displayed, an SMS trailer to append to the SMS message, etc.

Usage Process—TTS:

The user may choose to have the results read back via Text to Speech. This can be an option the user could disable to save network bandwidth, but adds value when in a situation where looking at the screen is not desirable, like when driving. If TTS is used, the TTS string is extracted from the results and sent via an HTTP request to the TTS servlet. Exemplary protocol details for such a request can be seen in FIG. 14. The request blocks until the TTS is generated and returns audio in the format supported by the phone in the body of the result. This is performed in a separate thread on the device since the transaction may take some time to complete. The resulting audio is then played to the user through the AudioService object on the client. Preferably, TTS speech from the server is encrypted using Corrected Block Tiny Encryption Algorithm (XXTEA) encryption.

Usage Process—Correct:

As a means of tracking accuracy and improving future SMS based language models, if the user makes a correction to transcribed text on the phone via the keypad before sending the message, the corrected text is submitted to the Correct servlet along with the receipt for the request. This information is stored on the server for later use in analyzing accuracy and compiling a database of typical SMS messages. Exemplary protocol details for such a submission can be seen in FIG. 15.

Usage Process—Ping:

Typically, web sessions will timeout after a certain amount of inactivity. The Ping servlet can be used to send a quick message from the client to keep the session alive. Exemplary protocol details for such a message can be seen in FIG. 16.

Usage Process—Debug:

Used mainly for development purposes, the Debug servlet sends logging messages from the client to a debug log on the server. Exemplary protocol details can be seen in FIG. 17.

Usage Process—Logout:

To logout from the Yap server, an HTTP logout request needs to be issued to the server. An exemplary such request would take the form: "/Yap/Logout;jsessionid=1234", where 1234 is the session ID.

User Preferences:

In at least one embodiment, the Yap website has a section where the user can log in and customize their Yap client preferences. This allows them to choose from available Yaplets and assign them to Yap9 keys on their phone. The user preferences are stored and maintained on the server and accessible from the Yap web application. This frees the Yap client from having to know about all of the different back-end Yaplets. It just records the audio, submits it to the server along with the Yap9 key and Yap9 screen used for the recording and waits for the results. The server handles all of the details of what the user actually wants to have happen with the audio.

The client needs to know what type of format to utilize when presenting the results to the user. This is accomplished through a code in the Results object. The majority of requests fall into one of two categories: sending an SMS message, or displaying the results of a web services query in a list format. Notably, although these two are the most common, the Yap architecture supports the addition of new formats.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method of operating one or more computing devices, the method comprising:
receiving a message type indicator identifying a message type from a first client device;
setting a message preference of a user of the first client device based at least in part on the message type indicator received from the first client device;
receiving audio data from the first client device;
receiving a designation of a second client device from the first client device;
transcribing the audio data to transcribed text;
generating a message of the message type based at least in part on the message preference of the user of the first client device, the message comprising the transcribed text;
identifying profile information in the transcribed text, wherein the profile information comprises at least one of an interest or a preference of the user of the first client device, and wherein the profile information is identified without input from the first client device;
causing the profile information that is identified without input from the first client device to be stored to a profile account associated with the user of the first client device and associated with the message type indicator;
causing the profile information, including the profile information that is identified without input from the first client device and that is stored in the profile account, to be made available for dissemination to a computing device of a contact authorized by the user; and
transmitting the message to the second client device.

2. The computer-implemented method of claim 1, wherein identifying profile information in the transcribed text comprises applying a profile filter to the transcribed text.

3. The computer-implemented method of claim 1, wherein the profile information is caused to be stored to the profile associated with the user of the first client device without requiring the user of the first client device to log into the profile account.

4. The computer-implemented method of claim 1, wherein the audio data is transcribed to text using a grammar.

5. The computer-implemented method of claim 1, wherein the audio data comprises at least one of a voicemail or a dictated text message.

6. The computer-implemented method of claim 1 further comprising delivering an ad impression to the second client device, and wherein the ad impression is based at least in part on the transcribed text.

7. The computer-implemented method of claim 1, wherein the first client device comprises at least one of a personal digital assistant, a tablet computer, a personal computer, a laptop computer, or a mobile phone.

8. The computer-implemented method of claim 1, wherein the profile is further associated with at least one of a social networking site or a recommendation engine.

9. The computer-implemented method of claim 1, wherein the profile information associated with the user of the first client device comprises at least one of an indication of the user's interest in a band, an indication of the user's interest in a movie, or personal data of the user.

10. The computer-implemented method of claim 1, wherein the profile account is one of a text message account or an instant message account.

11. The computer-implemented method of claim 1, wherein causing the profile information stored in the profile account to be made available for dissemination comprises receiving a request for the profile information from the computing device of the contact authorized by the user and transmitting the profile information to the computing device of the contact authorized by the user.

12. The computer-implemented method of claim 1, wherein causing the profile information stored in the profile account to be made available for dissemination comprises posting the profile information to network page associated with the user and accessible to the computing device of the contact authorized by the user.

13. A non-transitory computer-readable medium having a computer-executable module configured to execute in one or more processors, the computer-executable module being further configured to:
receive a message type indicator identifying a message type from a first client device;
set a message preference based at least in part on the message type indicator received from the first client device;
receive audio data from the first client device;
receive a designation of a second client device from the first client device;
transcribe the audio data to transcribed text;
generate a message of the message type based at least in part on the message preference received from the first client device, the message comprising the transcribed text;
obtain profile information from the transcribed text using the message type indicator, wherein the profile information comprises at least one of an interest or a preference of a user of the first client device, and wherein the profile information is obtained without input from the first client device;
cause the profile information that is obtained without input from the first client device to be stored to a profile account associated with the user of the first client device and associated with the message type indicator;
cause the profile information, including the profile information that is obtained without input from the first client device and that is stored in the profile account, to be made available for dissemination to a computing device of a contact authorized by of the user; and
transmit the message to the second client device.

14. The non-transitory computer-readable medium of claim 13, wherein the computer-executable module is configured to obtain the profile information from the transcribed text by applying a profile filter to the transcribed text.

15. The non-transitory computer storage of claim 13, wherein the profile information is caused to be stored to the profile account associated with the user of the first client device without requiring the user of the first client device to log into the profile account.

16. The non-transitory computer-readable medium of claim 13, wherein the computer-executable module is configured to transcribe the audio data to text using a grammar.

17. The non-transitory computer-readable medium of claim 13, wherein the audio data comprises at least one of a voicemail or a dictated text message.

18. The non-transitory computer-readable medium of claim 13, wherein the computer-executable module is further configured to deliver an ad impression based at least in part on the transcribed text to the second client device.

19. The non-transitory computer-readable medium of claim 13, wherein the computer-executable module is further configured to transmit the transcribed text to the first client device.

20. The non-transitory computer-readable medium of claim 13, wherein the first client device comprises at least one of a personal digital assistant, a tablet computer, a personal computer, a laptop, or a mobile phone.

21. The non-transitory computer-readable medium of claim 13, wherein the profile is further associated with at least one of a social networking site or a recommendation engine.

22. The non-transitory computer-readable medium of claim 13, wherein the profile information associated with the user of the first client device comprises at least one of an indication of the user's interest in a band, an indication of the user's interest in a movie, or personal data of the user.

23. A system comprising:
an electronic data store configured to store one or more algorithms that, when executed, implement an automatic speech recognition engine; and
one or more computing devices in communication with the electronic data store and with a web service configured to host one or more profiles, wherein the one or more computing devices are configured to:
receive a message type indicator identifying a message type from a first client device;
set a message preference based at least in part on the message type indicator received from the first client device;
receive audio data from the first client device;
receive a designation of a second client device from the first client device;
transcribe the audio data to transcribed text;
generate a message of the message type using the automatic speech recognition engine and based at least in part on the message preference received from the first client device, the message comprising the transcribed text;

obtain profile information from the transcribed text using the message type indicator, wherein the profile information comprises at least one of an interest or a preference of a user of the first client device, and wherein the profile information is obtained without input from the first client device;

provide the profile information that is obtained without input from the first client device to the web service for updating a profile account associated with the user of the first client device and associated with the message type indicator, wherein the profile information, including the profile information that is obtained without input from the first client device and that is provided to the web service, is available for dissemination from the profile account to a computing device of a contact authorized by the user; and transmit the message to the second client device.

24. The system of claim 23, wherein the one or more computing devices are configured to obtain the profile information from the transcribed text by applying a profile filter to the transcribed text.

25. The system of claim 23, wherein the one or more computing devices are further configured to provide the profile information to the web service for updating the profile account associated with the user of the first client device without requiring the user of the first client device to log into the profile account.

26. The system of claim 23, wherein the one or more computing devices are configured to transcribe the audio data to text using a grammar.

27. The system of claim 23, wherein the audio data comprises at least one of a voice mail or a dictated text message.

28. The system of claim 23, wherein:
the one or more computing devices are further configured to deliver an ad impression to the second client device; and
the ad impression is based at least in part on the transcribed text.

29. The system of claim 23, wherein the first client device comprises at least one of a personal digital assistant, a mobile phone, a personal computer, a tablet computer, or a laptop.

30. The system of claim 23, wherein the one or more computing devices are further configured to create an account associated with the user of the first client device, wherein the account is further associated with the web service and with the profile of the user of the first client device.

31. The system of claim 23, wherein the web service comprises at least one of a social networking site or a recommendation engine.

32. The system of claim 23, wherein the profile information associated with the user of the first client device comprises at least one of an indication of the user's interest in a band, an indication of the user's interest in a movie, or personal data of the user.

* * * * *

UNITED STATES PATENT AND TRADEMARK OFFICE
CERTIFICATE OF CORRECTION

PATENT NO. : 9,973,450 B2
APPLICATION NO. : 12/212644
DATED : May 15, 2018
INVENTOR(S) : Victor Roman Jablokov It is certified that error appears in the above-identified patent and that said Letters Patent is hereby corrected as shown below:

On the Title Page

Item (75), Line 3, change "Charolotte, NC" to --Charlotte, NC--

In the Specification

Column 11, Line 9, change "(T1)" to --(T3)--

Column 11, Line 12, change "(V2, T1, V/T1)" to --(V2, T4, V/T2)--

Column 11, Line 19, change "(V/T1)" to --(V/T3)--

Column 11, Line 20, change "T1)" to --T5)--

Column 11, Line 65, change "T1" to --T2--

Column 12, Line 19, change "T1" to --T2--

Column 12, Line 20, change "(T1)" to --(T2)--

Column 12, Line 21, change "T1" to --T3--

Column 12, Line 23, change "(T1)" to --(T3)--

Column 12, Line 24, change "T1" to --T4--

Column 12, Line 25, change "T1-T1" to --T4-T4--

Column 12, Line 28, change "T1" to --T4--

Signed and Sealed this
Twenty-eighth Day of May, 2019

Andrei Iancu
*Director of the United States Patent and Trademark Office*

CERTIFICATE OF CORRECTION (continued)
U.S. Pat. No. 9,973,450 B2

Column 12, Line 32, change "V/T1" to --V/T2--

Column 12, Line 34, change "V/T1" to --V/T3--

Column 12, Line 36, change "V/T1" to --V/T3--

In the Claims

Column 24, Line 11, Claim 13, change "by of the" to --by the--

Column 24, Line 17, Claim 15, change "computer storage" to --computer-readable medium--